United States Patent [19]
Fujimoto

[11] Patent Number: 5,912,710
[45] Date of Patent: Jun. 15, 1999

[54] SYSTEM AND METHOD FOR CONTROLLING A DISPLAY OF GRAPHICS DATA PIXELS ON A VIDEO MONITOR HAVING A DIFFERENT DISPLAY ASPECT RATIO THAN THE PIXEL ASPECT RATIO

[75] Inventor: Akihisa Fujimoto, Tokyo, Japan

[73] Assignee: Kabushiki Kaisha Toshiba, Kawasaki, Japan

[21] Appl. No.: 08/992,916

[22] Filed: Dec. 18, 1997

[30] Foreign Application Priority Data

Dec. 18, 1996 [JP] Japan .................................. 8-338545

[51] Int. Cl.⁶ .................................................... H04N 9/74
[52] U.S. Cl. ........................ 348/445; 348/584; 348/581; 348/589
[58] Field of Search .................... 348/445, 441, 348/584, 581, 556, 589; 345/115, 113, 154

[56] References Cited

U.S. PATENT DOCUMENTS

| | | | |
|---|---|---|---|
| 4,872,054 | 10/1989 | Gray et al. | 348/441 |
| 5,541,666 | 7/1996 | Zeidler et al. | 348/584 |
| 5,739,867 | 4/1998 | Eglit | 348/441 |
| 5,742,274 | 4/1998 | Henry et al. | 345/154 |
| 5,781,241 | 7/1998 | Donovan | 348/441 |

*Primary Examiner*—Victor R. Kostak
*Attorney, Agent, or Firm*—Oblon, Spivak, McClelland, Maier & Neustadt, P.C.

[57] ABSTRACT

A system and method for displaying graphics data having a pixel aspect ratio on a television monitor with improved quality including initially up scaling the resolution of the graphics data in a horizontal direction so as to keep the original pixel aspect ratio of the graphics data constant. The graphics data and the television monitor having a different aspect ratios. The graphics data are scaled in the horizontal direction so as to coincide with a horizontal resolution of the television monitor. The system improves display of graphics images on television monitors while using simplified algorithms and hardware.

16 Claims, 17 Drawing Sheets

Video Window + Background (Graphics)

Video/Background (Graphics)

SYSTEM AND METHOD FOR CONTROLLING A DISPLAY OF GRAPHICS DATA PIXELS ON A VIDEO MONITOR HAVING A DIFFERENT DISPLAY ASPECT RATIO THAN THE PIXEL ASPECT RATIO

BACKGROUND OF THE INVENTION

1. Field of the Invention

The present invention relates to a system and method for controlling a display of graphics data having a pixel aspect ratio on a video monitor having a different display aspect ratio than the pixel aspect ratio. In particular, the present invention relates to a system and method for controlling a display of mixed images of the graphics data and motion picture data on a television monitor with a canceling of the difference between the aspect ratios.

In addition, the present invention relates to a system and method for controlling a display of images of non-interlaced graphics data on an interlaced video monitor by canceling a difference between respective aspect ratios.

Furthermore, the present invention relates to a system and method for controlling a display of graphics data having a particular pixel aspect ratio on a video monitor having a different display aspect ratio without any distortion of the graphics data pixels.

2. Discussion of the Background

In recent years, in accordance with development of computer technologies, a variety of digital devices, such as digital video players or set-top-boxes, have been developed for use with an in-home television (TV) receiver used as a monitor for displaying computer graphics data, video etc. These type of digital devices control reproduction and display of mixed data including computer graphics data and motion picture data stored on a media. The mixed data is typically stored on the media as compressed data using digital compression coding. An optical disk, such as a compact disk (CD) or a digital versatile disk (DVD), are typically used as the data storing media.

The DVD utilizes a new standard for coding of a video information, such as a movie, in order to store a large amount of data on a small disk space. For example, a DVD coded full-length movie could be stored on a DVD the size of a standard CD (typically 640 MB) with a high quality. The new coding standard for the coding of DVD video information is referred to as motion picture experts group 2 (MPEG2) coding. For storing large amounts of high quality image data on the DVD disk, the MPEG2 coding for the DVD basically utilizes a variable rate coding technique for recording and reproducing the video data.

The amount of image data that can be stored on a DVD using the variable rate coding is dependent upon characteristics of the image data. Image data that is made up of scenes having a lot of motion require a greater amount of storage than scenes with lesser motion. The stored motion picture data in the DVD are basically reproduced using image signals of a particular television standard, such as National Television System Committee (NTSC) standard, Phase Alternation by Line (PAL), standard, etc. Consequently, the video data reproduced from a MPEG2 decoder are provided as non-interlaced picture signals to a video monitor.

In addition, recent developments in computer technology have made it possible to increase operational speeds of central processing units (CPUs) and graphics controllers. Accordingly, a higher grade of graphics data, such as three dimensional graphics, can be displayed on a television monitor by using a digital video player or a set-top box. That is, the users of the set-top box can interactively change the displayed images on the video monitor by varying the graphics data in various forms. In this way, a display of mixed high grade images comprising graphics data and motion picture data is now possible.

However, it is typically not possible to reproduce mixed images of graphics data and video data on a television monitor with improved graphics data quality. Displaying non-interlaced computer graphics data on an interlaced television monitor, results in the following problems:

(1) Differences between graphics data pixel aspect ratio and video monitor display aspect ratio:

Computer graphics data usually have a pixel aspect ratio of 1 to 1 (1:1). In contrast, a video or television monitor has a different display aspect ratio than that of the graphics data pixel. The television monitor usually has a display ratio that is wider in a horizontal direction than in a vertical direction (e.g., 16:9 or 4:3). As result of this, when the graphics data are displayed on the television monitor, without modification, the reproduced graphics data are displayed in a distorted form rather than in the original form. For example, if a circle comprises the graphics data having a given pixel aspect ratio for display on a non-interlaced computer monitor, when the circle is reproduced on an interlaced video or television monitor having a horizontally wider aspect ratio, the circle is displayed as a vertically elongated ellipse on the television monitor.

(2) Differences of signal bandwidths of interlaced and non-interlaced monitors:

A television monitor utilizes an interlaced scanning display or monitor. On the contrary, a computer uses a non-interlaced scanning display. The graphics data displayed on the non-interlaced scanning monitor have wider bandwidths for brightness and color signals than the bandwidths for brightness and color signals for a motion picture (video) data. These bandwidth difference of brightness and color signals between the graphics data and the motion picture data, result in flickering of the reproduced computer graphics data on the television monitor.

SUMMARY OF THE INVENTION

Accordingly, it is an object of the present invention to solve the aforementioned problems and defects of displaying graphics data having a certain pixel aspect ratio on a television monitor having a different aspect ratio with improved quality.

It is another object of the present invention to provide a system and method for controlling a display of graphics data having a certain pixel aspect ratio on a television monitor having a different aspect ratio by effectively canceling the difference between the aspect ratios in a simplified pipeline operation of scaling and filtering the graphics data.

It is a further object of the present invention to provide a system and method for controlling a display of mixed images of graphics data and motion picture data on a video monitor having a different aspect ratio than a pixel aspect ratio of the graphics data with improved quality.

It is a still further object of the present invention to provide an system and method for canceling the differences between the pixel aspect ratio of graphics data and a display aspect ratio of a video monitor by scaling in one direction.

It is a still further object of the present invention to provide an apparatus and method for controlling a display of mixed images of graphics and video data on a video monitor by an effective pipeline operation of scaling and filtering the graphics data without using large expensive video memory.

It is a still further object of the present invention to provide an system and method for simplifying address calculation for displaying graphics data on a video monitor by an efficient access operation to a video memory.

It is a still further object of the present invention to provide a system and method for displaying combined images comprised of graphics data and motion picture data with improved quality by efficiently canceling a differences between pixels of the graphics data and the motion picture data.

It is a still further object of the present invention to provide a system and method for controlling interactively a display of combined images of graphics data and motion picture data stored on a DVD on a television monitor with improved quality.

These and other objects are achieved according to the present invention by providing a system for displaying images constructed by blending motion picture data and graphics data on a video monitor comprising, a disk for storing the motion picture data having a predetermined horizontal and vertical resolutions correspond to a display aspect ratio of the video monitor and the graphics data having a pixel aspect ratio and having a predetermined vertical resolution by scaling up or down the horizontal resolution of the motion picture data, and an apparatus for controlling image displays on the video monitor by reading the data stored in the disk and by generating interlaced image signals of the blended data of the motion picture data and the graphics data for providing to the video monitor, wherein, the image display control apparatus comprising, a memory for storing the graphics data read out from the disk, a color converting controller for providing color data for the graphics data by reading out the data for each set of predetermined number of display lines from the memory so as to generate the same color data for the motion picture data, a filter for vertically filtering the converted color data for the graphics data with each predetermined number of pixels in each of the display lines, a first scalar for scaling up or down the pixel aspect ratio of the filtered graphics data correspond to the display aspect ratio of the video monitor, a decoder for decoding the motion picture data read out from the disk under the display aspect ratio of the video monitor, a second scalar for scaling down the decoded motion picture data correspond to a video window size displayed on the video monitor, a blending circuit for blending the scaled graphics data from the first scalar and the scaled motion picture data from the second scalar for every pixels of the blended image, and an encoder for generating interlaced image signals for the video monitor by encoding the blended data from the blending circuit.

Furthermore, the system according to the present invention is characterized in that the system utilizes horizontally enlarged graphics data by enlarging horizontal resolution of the data from a viewpoint that the pixel aspect ratio for video signals, such as television image signals, become longer in a horizontal direction when they are displayed on a video monitor of 16:9 display aspect ratio.

By scaling down the preliminary enlarged graphics data in a horizontal direction, it becomes possible to cancel the differences between the pixel aspect ratios for graphics data and video signals on the video monitor.

Furthermore, the system according to the present invention is characterized in that the horizontal resolution of the graphics data is enlarged by determining to a beforehand value that is selected among the multiples of 8 or 16 and that is closest to a value obtained by multiplying the horizontal resolution for the video signal with the pixel aspect ratio of the video signal.

BRIEF DESCRIPTION OF THE DRAWINGS

A more complete appreciation of the present invention and many of the attendant advantages thereof will be readily obtained as the same becomes better understood by reference to the following detailed description, when considered in connection with the accompanying drawings, wherein.

DETAILED DESCRIPTION OF THE PREFERRED EMBODIMENTS

Figure 1:
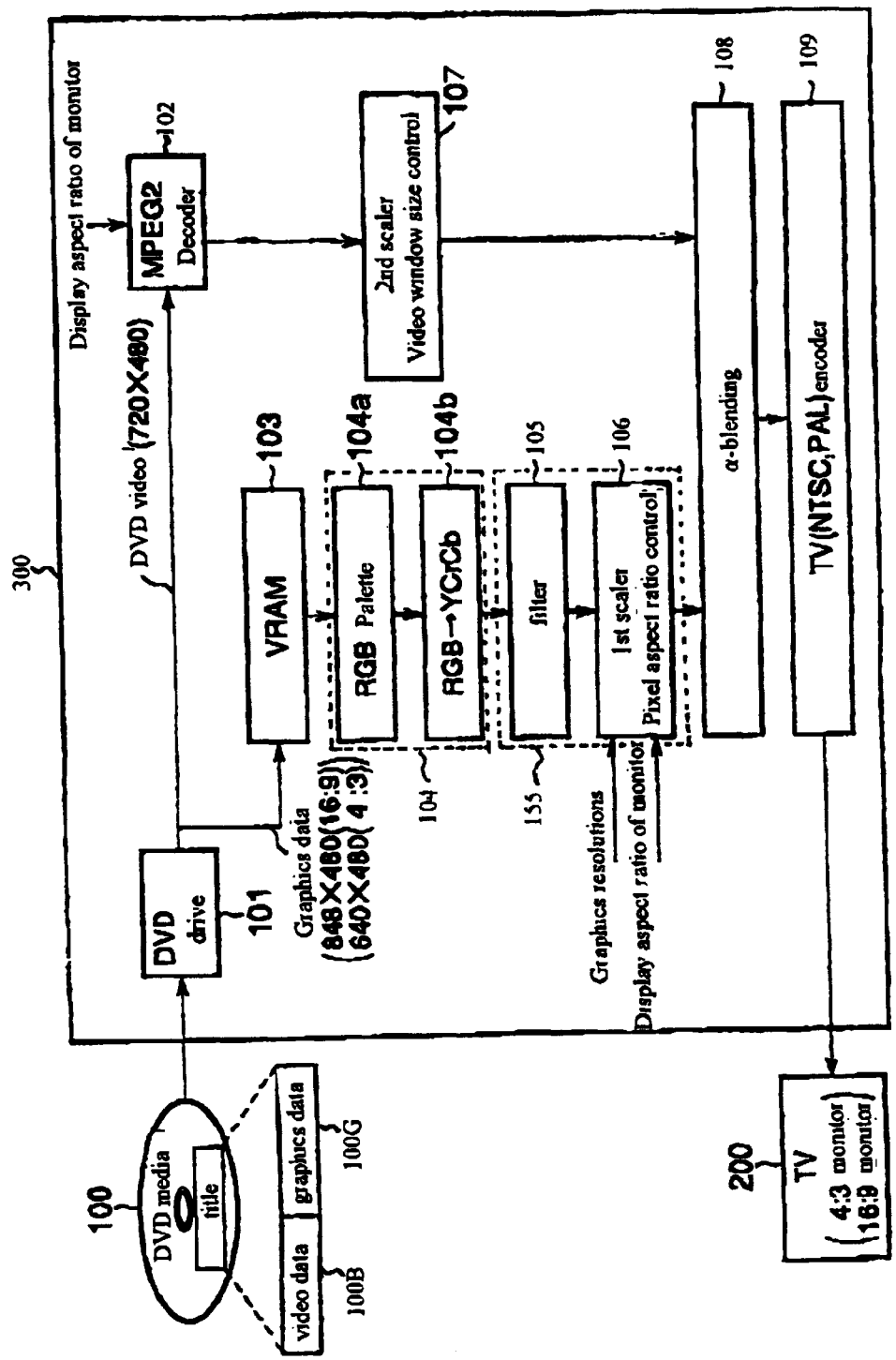
FIG. 1 is a block diagram of an image display control system according to the present invention.

Referring now to the drawings, wherein like reference numerals designate identical or corresponding parts throughout the several views, and more particularly to FIG. 1 thereof, there is illustrated a system block diagram including an image display control apparatus 300 for displaying blended images on a television monitor 200 by combining graphics data 100G and motion picture or video data 100B stored on a DVD media 100 according to the present invention.

In FIG. 1, the image display control apparatus 300 is typically referred to as a digital video player or a set-top box. The apparatus 300 reads out graphics data 100G and video data 100B (also referred to as "motion picture data") recorded on the DVD media 100 and generates image signals for displaying the blended images comprising the graphics data and motion picture data on the television monitor 200 which has a particular display aspect ratio.

The image display control apparatus 300, as shown in FIG. 1, is comprised of a DVD ROM drive 101, a MPEG2 decoder 102, a video memory, such as a volatile random access memory (VRAM) 103, a color data controller 104 that includes a RGB color palette 104a and a color space converter 104b, a display controller 155, that includes a filtering circuit 105 and a first scalar 106, for changing pixel aspect ratio of the graphics data 100G, a second scalar 107 for changing a size of the motion picture data 100B so that it fits in a video window of a given size on the monitor 200, a α-blending circuit 108 and an NTSC/PAL encoder 109 for providing image signals to the television monitor 200.

The DVD-ROM driver 101 reads data (DVD video), such as the video data 100B and the graphics data 100G that are stored in the DVD media 100, such as an optical disk. The graphics data 100G are used, for example, as a background image for the motion picture or video data 100B. The graphics data 100G are written into the video memory 103 by a central processing unit (CPU, not shown in FIG. 1) executing an application program for reproducing a DVD title in the image display control apparatus 300.

There are two types of image sources for storing as the video data 100B in the DVD media 100. One image source corresponds to a standard television monitor having a display aspect ratio of 4:3. Another image source corresponds a wide type television monitor, such as a high-definition television (HD-TV) monitor or an extended-definition television (ED-TV) monitor having a display aspect ratio of 16:9. In either case, the resolution (a horizontal resolution×a vertical resolution) is 720×480.

The video data 100B includes main picture data (video), sub-picture data and audio. The video data 100B are coded by using MPEG2 coding, and the sub-picture data and the audio data are coded by using run-length coding and DOLBY AC3, respectively. Under the MPEG2 standard, it is possible to include another type of coding data in the MPEG2 coding data. However, the combined data having different coding are treated as a single MPEG2 program stream. Accordingly, it is possible to include both a plurality of sub-picture data of up to sixteen (16) channels and a plurality audio data of up to eight (8) channels within the main MPEG2 coded video data 100B.

As explained before, it is possible to vary the recording/reproducing amount per unit time of the MPEG2 coding data depending upon the transfer rate of the MPEG2 stream, because the MPEG2 coding is basically using a variable-rate coding. Accordingly, it is possible to increase the transfer rate of the MPEG2 stream corresponding to the motion of the displayed scene for reproducing the motion picture data with high quality.

There are also two resolutions for storing the graphics data 100G in the DVD media 100. One resolution (horizontal resolution×vertical resolution) is 640×480 for displaying on a standard television monitor having a display aspect ratio of 4:3. Another resolution is 848×480 for displaying on a wide type television, such as a HD or ED television having a display aspect ratio of 16:9. In either cases, the pixel aspect ratio is 1:1.

One feature of the present invention, is to preset the resolution of the graphics data to 848×480 to correspond to a display aspect ratio of 16:9. This feature allows simplifying a scaling operation for displaying the graphics data on a television monitor so as to keep the pixel aspect ratio of the graphics data to 1:1. That is, the graphics data can be displayed on a television monitor with high quality, by preparing, in advance, an enlarged resolution of the graphics data in a horizontal direction.

The MPEG2 program stream read out from the DVD media 100 (DVD video) is provided to a MPEG2 decoder 102. In the MPEG2 decoder 102, the MPEG2 program stream is separated into the video data, the sub-picture data and the audio data, and the respective data are decoded and synchronized. After combining the decoded data of the video and the sub-picture data, the combined motion picture data are supplied to the second scalar 107.

The scalar 107 is used to scale down the size of the motion picture data (i.e, 720×480), for adjusting the data to fit on video window which is smaller than the motion picture data size (e.g., less than 720×480).

The α-blending circuit 108 constructs pixels of picture elements by blending the motion picture data from the scalar 107 and the graphics data from the scalar 106. The construction ratio between the motion picture data and the graphics data is dependent on the value of "α". The α value is a parameter for indicating a transmission degree of the graphics data in the respective pixels. The transmission ratio for the motion picture data in each pixels is represented as (1−α). That is, in the case of α=1, only the graphics data are displayed, and the motion picture data are not displayed. On the other hand, if α=0 only, the motion picture data are displayed, and the graphics data are not displayed.

The television encoder 109 converts the constructed image data from the α-blending circuit 108 into interlaced image signals under a particular television system standard, such as the National Television System Committee (NTSC) standard, Phase Alternation by Line (PAL), standard, etc., and supplies the television signals of the particular system standard to the television monitor 200 for displaying the combined images in an interlaced scanning mode.

The television monitor 200 can typically support two types of display aspect ratios. One is a standard mode for displaying images having a display aspect ratio of 4:3. And the other is a wide screen, for wide type television, such as a high-definition television (HD-TV) or an extended-definition television (ED-TV), etc. having a display aspect ratio of 16:9. A user can select between the two display aspect ratios for displaying the images by operating, for example, a remote controller. The display aspect ratio is changed in the television monitor or receiver when the user selects a particular display mode.

The data processing is executed as follows. As explained before, the graphics data 100G read out from the DVD media 100 are stored in the video memory (VRAM) 103 under CPU software execution via the DVD drive 101. The graphics data for a predetermined number of display lines are read out from the VRAM 103 and supplied to the color data controller 104. The color data controller 104 comprises an RGB color palette circuit 104a and a color space converter 104b.

For example, during a period of displaying odd number fields, a particular unit of graphics data for displaying a particular odd number line and a couple of even number lines, having the odd number line in between, are alternately read out from the VRAM 103 in a time sharing fashion. The particular unit of graphics data for the particular three lines are supplied to the RGB color palette circuit 104a successively for each of the pixels.

The RGB color palette circuit 104a converts the pixel data to RGB color data. For example, when one pixel of the graphics data is comprised of an index color mode having eight bits/pixel, the index color data are converted to a color data of twenty-four bits for the respective colors of R (red), G (green) and B (blue). When the graphics data stored in the VRAM 103 are comprised of RGB color data having more than sixteen bits/pixel, the RGB color palette circuit 104a is used for correcting the respective RGB colors.

The color space converter 104b converts the RGB color data from the color palette circuit 104a to YCrCb television standard data. Namely, the color space converter 104b converts the RGB color data so as to be the same as the motion picture data (DVD video).

The filtering circuit 105 reduces the brightness and the color signal bandwidth of the graphics data to adjust the image signals for the television monitor 200. That is, a unit of graphics data that includes a particular number of pixels for each of the three lines are filtered in a horizontal direction.

The first scalar 106 converts the pixel aspect ratio of filtered graphics data so as to correspond to the display aspect ratio of the television monitor 200. Namely, the first scalar 106 scales up or scales down the pixel aspect ratio of the unit data of each of the lines, in a horizontal direction. The scaling operation of the first scaler 106 is determined by a program for reproducing a DVD title or a display driver (not shown) with consideration of the relationships between the resolutions of the graphics data 100G and the display aspect ratio of the television monitor 200. The resolutions of the graphics data 100G can be read out from a header information for the graphics data 100G. Further, the display aspect ratio of the television monitor can be recognized when the program for reproducing a DVD title requests a user to select a display aspect ratio or when the image display control apparatus 300 communicates automatically to the television 200 via an interface therebetween.

As explained above, the filtering circuit 105 and the first scaler 106 are provided for converting the graphics data 100G intended for non-interlaced display and stored in the VRAM 103 for display on interlaced television monitor 200 with improved quality. As explained before, the scaled graphics data through the first scaler 106 are supplied to the α-blending circuit 108, and blended with the motion picture data from the second scalier 107. Then the blended image data are displayed on the monitor 200 through the television encoder 109.

Figure 2:
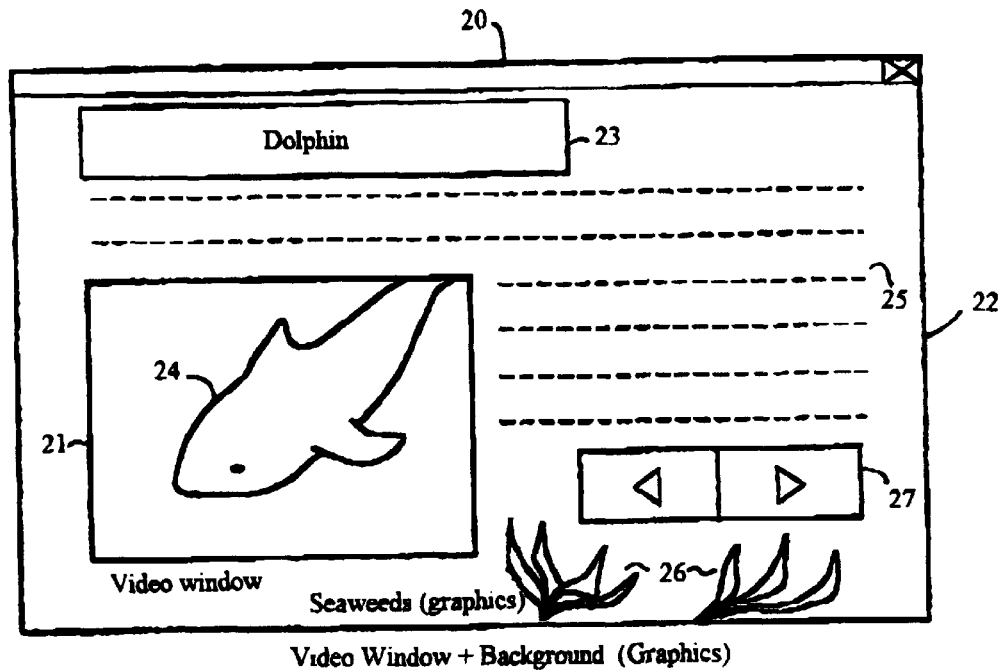
FIG. 2 is a sample image, displayed according to the system shown in FIG. 1.

FIG. 2 illustrates sample displays of a blended image comprising motion picture data and graphics data. In FIG. 2, in a screen 20 are displayed the motion picture data displayed in a video window 21 and graphics data 22. The graphics data 22, for example, the contents of an electronic encyclopedia, are displayed as a background image for the video window 21. That is, the graphics data, displayed as the background image, may comprise a title 23 of the subject of the video window 21, attribute information 25, such as descriptive information of the subject of the video, image data 26 suitable for the video window 21, such as background graphics, and screen operation buttons 27. In the video window 21, an object 24 is displayed as a natural motion picture image. In FIG. 2, a sample object 24 (i.e., subject of the video) is a dolphin and the image data 26 are seaweeds.

Figure 3:
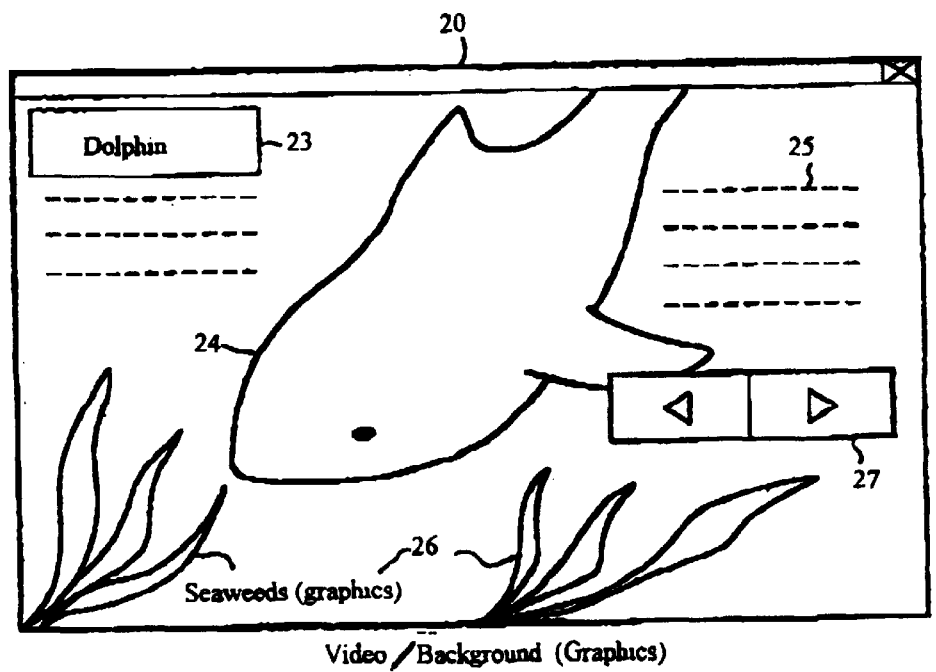
FIG. 3 is another sample image, displayed according to the system shown in FIG. 1.

FIG. 3 illustrates sample displays of the blended image comprising motion picture data and graphics data, shown in FIG. 2, in a full screen mode. The motion picture image of the sample object 24 (e.g., the dolphin), along with the graphics data images including the title 23, attributes 25, image data 26 and operation buttons 27 are displayed in full screen mode.

Figure 4:
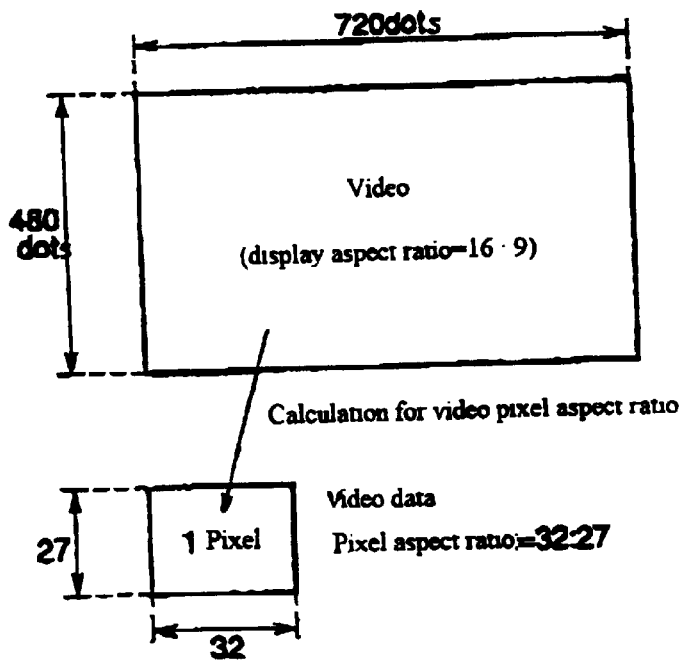
FIG. 4 illustrates a relationship between a resolution of DVD video data used in the system in FIG. 1 and a pixel aspect ratio displayed on a television monitor having a display aspect ratio of 16:9.
Figure 5:
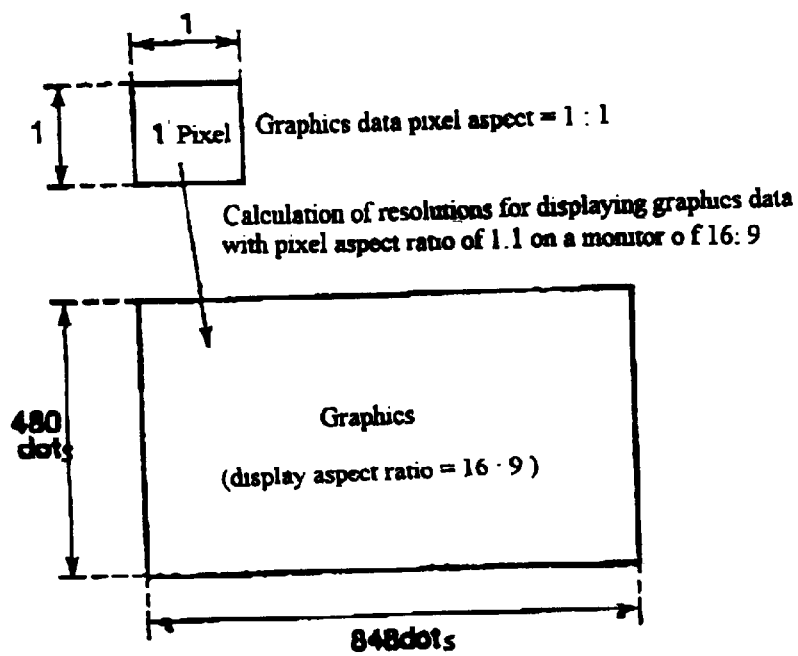
FIG. 5 shows resolution of graphics data used for the system shown in FIG. 1.

FIGS. 4 and 5 are used to define the graphics data according to the present invention. FIG. 4 illustrates a relationship between the resolutions of the DVD video data of 720×480 and the pixel aspect ratio in the case of displaying the DVD data on a television monitor having a display aspect ratio of 16:9. In this case, the pixel aspect ratio of the DVD video data (X:Y) is determined by the following equations:

$$720 \times X : 480 \times Y = 16:9 \qquad (1)$$

$$X:Y=32:27 \qquad (2)$$

Accordingly, the television monitor having the display aspect ratio of 16:9 has an oblong pixel aspect ratio (i.e., 32:27).

FIG. 5 is used to illustrate the necessary resolutions (horizontal×vertical) for displaying the graphics data having a pixel aspect ratio of 1:1 on a television monitor having a display aspect ratio of 16:9, while keeping the pixel aspect ratio of 1:1. In FIG. 5, since the television monitor, having the display aspect ratio of 16:9, has an oblong pixel aspect ratio, the pixel aspect ration of 1:1 needs to be up scaled up in the horizontal resolution direction (vertical size) for displaying on the monitor. As shown in FIG. 5, the final resolutions are set to, for example, 848×480. The value 848 for the horizontal resolution (vertical size) of the graphics is selected as the closest value to the value that was obtained by multiplying 740 (the horizontal resolution for the video data) by 32/27 within multiple values of 16. In practice, the following values of resolutions are used as the graphics data for displaying on the television monitor having an aspect ratio of 16:9:

(1) 848×480;

(2) 868×480; and (3) 832×480.

However, instead of using multiples of 16, it is possible to use multiples of 8. By using multiples of 8 or 16 as the horizontal size of the graphics data, simplification of address calculation for reading/writing of the graphics data from the video memory (VRAM) 103 can be achieved. The example values of the resolution for the graphics data are calculated for a DVD video source of the NTSC standard. In the case of that the DVD video source uses the PAL standard system, the appropriate values of resolutions are selected in order to accommodate that system.

Figure 6:
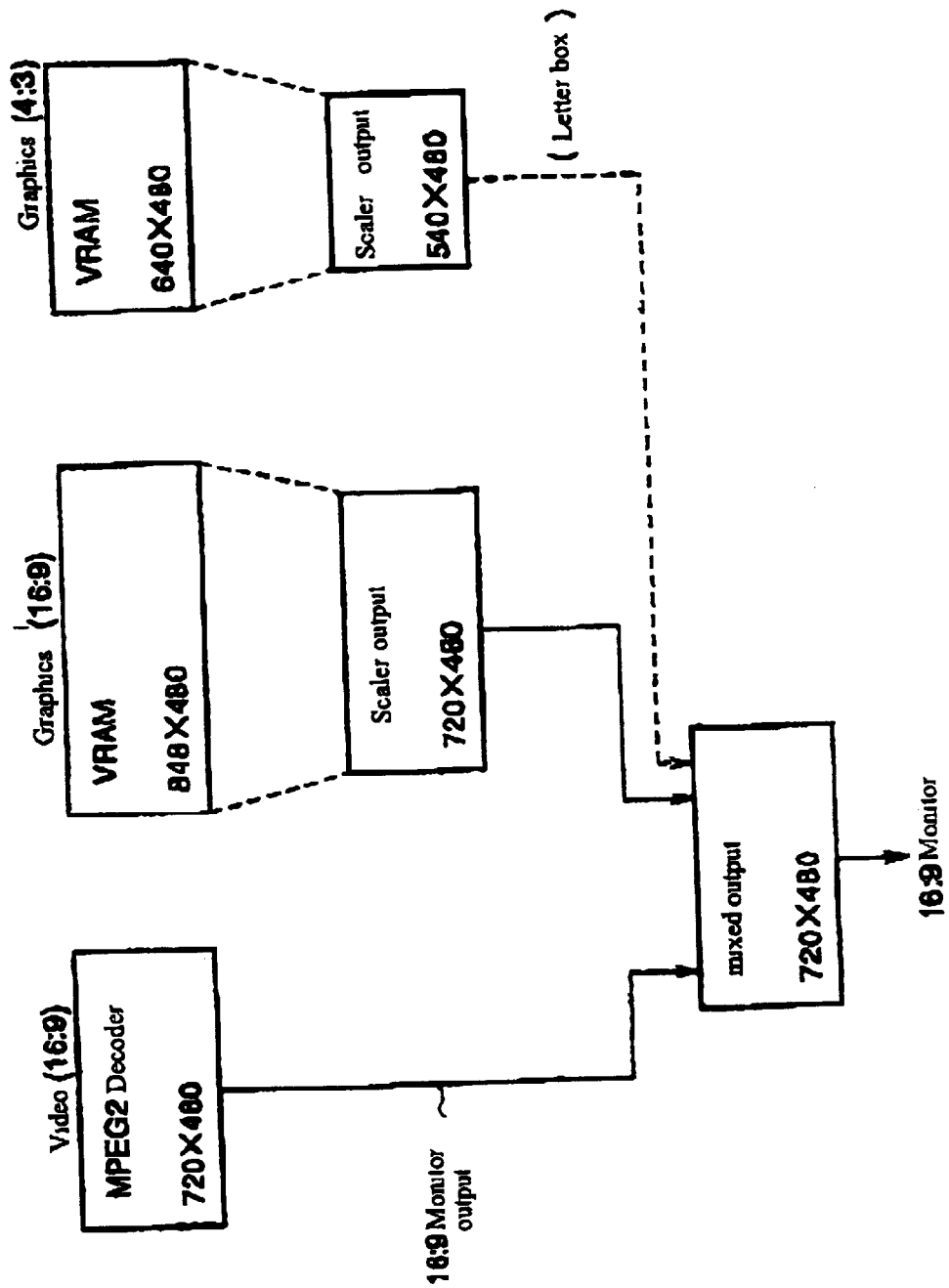
FIG. 6 is used to illustrate relationships between resolutions for graphics data and video data for producing combined image data.

FIG. 6 is used to illustrate a graphics scaling method for displaying combined images of DVD video data and graphics data on a television monitor having a display aspect ratio of 16:9. As explained before, the preferred embodiment is intended to use the following two types of graphics data:

(1) graphics data for the display aspect ratio of 16:9 using 848×480 resolution; and (2) graphics data for the display aspect ratio of 4:3 using 640×480 resolution.

In case of displaying the graphics (resolutions of 848×480) for the display aspect ratio of 16:9, the graphics data are horizontally scaled down by the first scalar 106 in FIG. 1 and are converted to the resolutions of 720×480 so as to be the same as the DVD video data. Then the scaled graphics data are blended with the video data from the MPEG2 decoder 102 in the α-blending circuit 108 for displaying on the television monitor 200 having a display aspect ratio of 16:9.

By first enlarging the graphics data in a horizontal direction rather than the video data, it becomes possible to cancel the differences of the pixel aspect ratios between the graphics data and the video data by simply scaling down the pixels for the graphics data in a horizontal direction. This is because the graphics data are enlarged in a horizontal direction when they are displayed on the video monitor having the display aspect ratio of 16:9.

In the case of displaying the video data supplied from the MPEG2 decoder in the video window 21 as shown in FIG. 2, the second scaler 107 in FIG. 1 controls the change in the resolutions for the video data.

In the case of displaying the graphics data of 640×480 resolution on a display aspect ratio of 4:3, the graphics data are horizontally scaled down and converted to the resolutions of 540×480 for displaying a letter box by the first scaler 106 in FIG. 1. Then the scaled graphics data are blended with the video data from the MPEG2 decoder in the α-blending circuit 108 for displaying them on the television 200 having a display aspect ratio of 16:9. In this case, the differences of the pixel aspect ratios of the graphics data and display aspect ratio of the video data, due to scaling down of the pixels for the graphics data when they are displayed on the video monitor having the display aspect ratio of 16:9, can be also cancelled.

Figure 7:
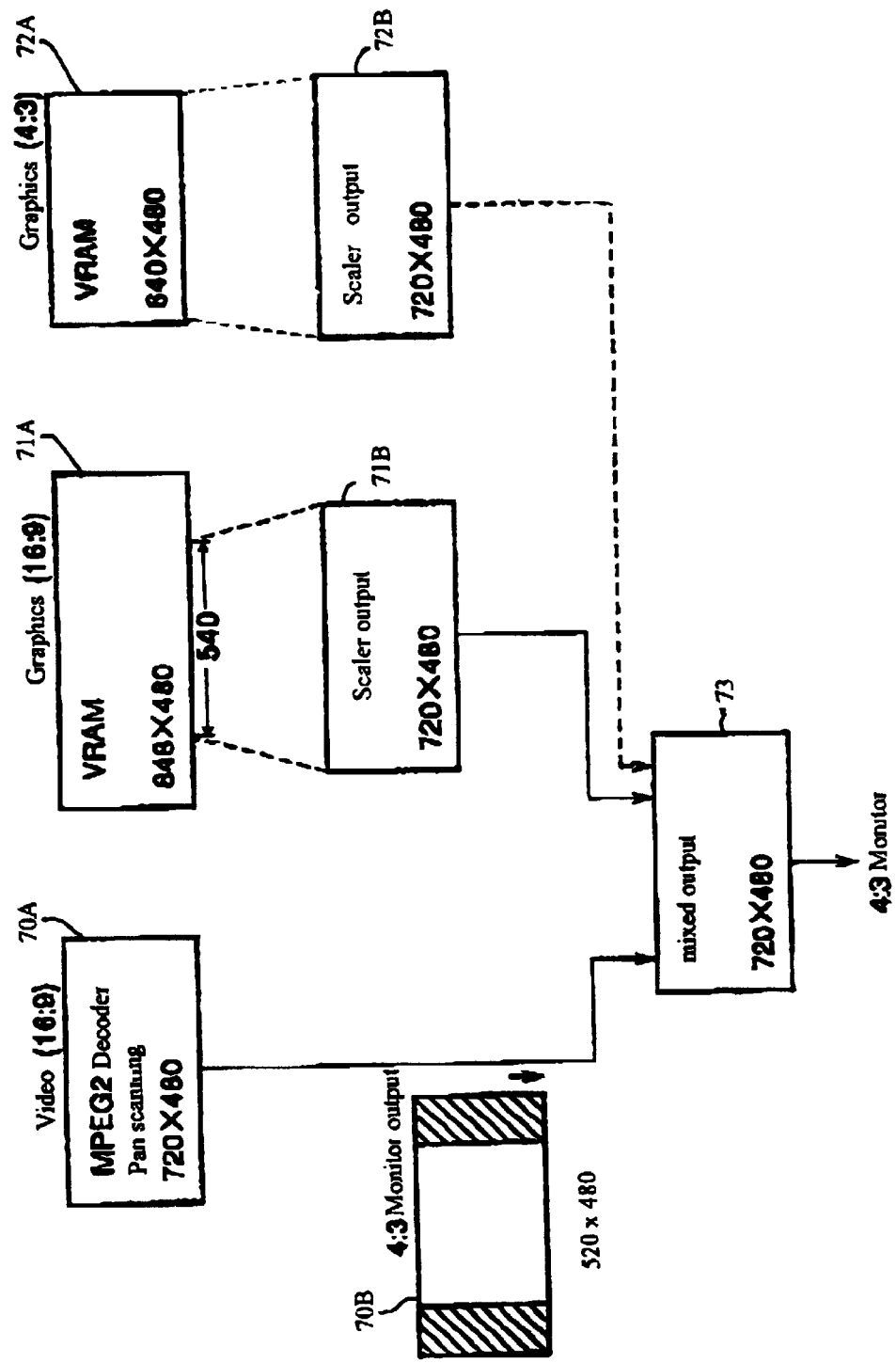
FIG. 7 is used to illustrate a graphics scaling method for displaying images constructed by combining DVD video data and graphics data on a television having a display aspect ratio of 16:9 in the system shown in FIG. 1;.

FIG. 7 is used to illustrate a method for controlling a display of combined data comprising DVD video data and graphics data on a television having a display aspect ratio of 4:3. In the case of displaying graphics data 71A having resolutions of 848×480 for a display aspect ratio of 16:9, center area data for the 540 pixels in a horizontal direction are read out from the VRAM by eliminating edge area data in the VRAM. The center area data are scaled up in a horizontal direction and converted to the data 71B having the resolutions of 720×480 so as to be the same as the DVD video data. By this up scaling, the pixel aspect ratio becomes the same as that of the video data. An actual image data 70B, for the display aspect ratio of 4:3, for example, that have resolutions of 540×480, are read out as a pan-scanning data 70A from the MPEG2 decoder. The pan-scanned video data and the scaled up graphics data are combined in the α-blending circuit 108 and the combined data are displayed on a television monitor 200 having a display aspect ratio of 4:3. Since the graphics data are enlarged in a longitudinal direction, when they are displayed on the television having the display aspect ratio of 4:3, the differences between the pixel aspect ratios of graphics data and the video data can be cancelled.

In the case of displaying graphics data 72A having resolutions of 640×480 for display aspect ratio of 4:3, the graphics data are scaled up in a horizontal direction and converted to the data 72B having the resolutions of 720×480 so as to be the same as the DVD video data. By this up scaling, the pixel aspect ratio becomes the same as that of the video data. As in the previous case, an actual image data 70B for the monitor display aspect ratio of 4:3, for example, that have resolutions of 540×480, are read out as a pan-scanning data 70A from the MPEG2 decoder. The pan-scanned video data 70B and the scaled up graphics data 72B are combined in the α-blending circuit 108 and the combined data 73 are displayed on the television monitor 200 having a display aspect ratio of 4:3.

As explained above, according to the present invention, the graphics data having a pixel ratio of 1:1 are converted and displayed with horizontal scaling only. Consequently, the system and apparatus for controlling the combined displays do not need to include hardware for scaling in a vertical direction. Accordingly, the cost of the system and apparatus is reduced.

Figure 8:
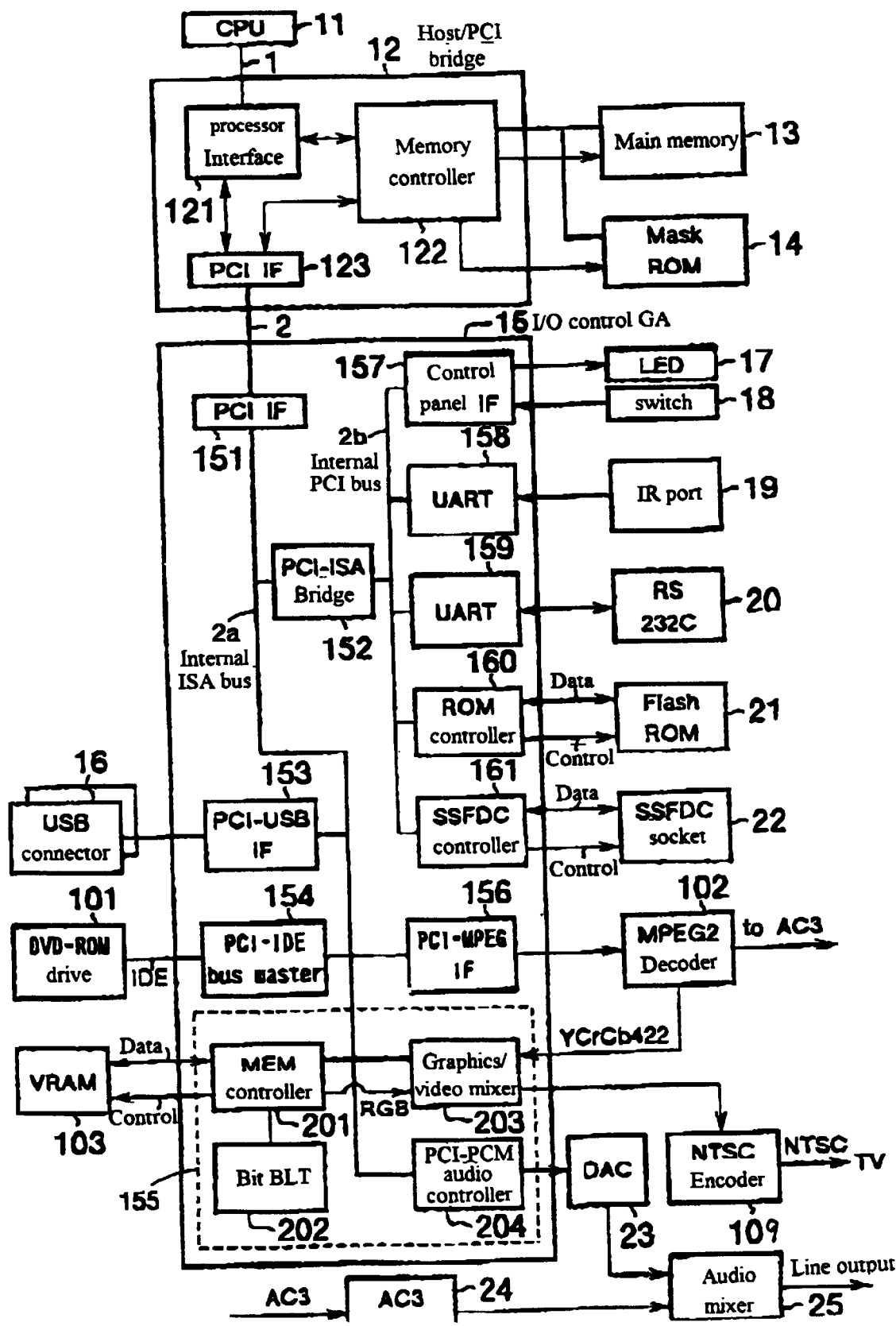
FIG. 8 is a block diagram showing a preferable embodiment of an image display control apparatus according to the present invention.

FIG. 8 is a detailed block diagram of the image display control apparatus 300 shown in FIG. 1. The image display control apparatus 300 can reproduce a DVD title from the DVD media 100 by using the DVD-ROM driver 101 and also can execute various applications, such as a game software or a viewer.

Before constructing the motion picture data in the α-blending circuit 108, the graphics data are scaled to change the pixel aspect ratio and are vertically filtered to reduce brightness and color signal bandwidth so as to adjust resulting image signals for display on the TV receiver 200. The image display control apparatus can control a display to reproduce motion pictures by utilizing the DVD-ROM as shown in FIG. 1, and can also execute many types of application programs, such as video games and viewer software.

The image display control apparatus includes a central processing unit (CPU) 11, a host/program controlled interruption (PCI) bridge 12, a main memory 13, an operating system (OS) stored on mask read-only-memory (ROM) 14, input-output (I/O) control gate array 15, a USB connector 16, status displaying light emitting diodes (LEDs) 17 on a control panel, user switches 18 on the control panel, an infrared communication port 19, an RS232C connector 20, a system BIOS stored in a flash ROM 21, a socket 22 for a flash memory card, a D/A (Digital-to-Analog) converter 23, an AC3 decoder 24, and an audio mixer 25. In addition, as explained in FIG. 1, the image display control apparatus includes a DVD-ROM drive 101, a MPEG2 decoder 102, a video memory (VRAM) 103 and an NTSC/PAL encoder 109.

The CPU 11 controls system operations of the image display control apparatus and executes an operating system and application programs that are loaded in the main memory 13. Further, the CPU 11 executes various driver programs.

The host/PCI bridge 12 is a large-scale Integrated (LSI) circuit for converting bi-directional transactions between a processor bus 1 and a PCI bus 2. As shown in FIG. 2, the host/PCI bridge 12 includes a processor bus interface 121 coupled to the processor bus 1 and a PCI bus interface 123 coupled to the PCI bus 2. Further, the host/PCI bridge 12 includes a memory controller 122 for controlling access to the main memory 13 or the mask ROM 14 in accordance with memory read/write transactions provided from the CPU 11 or another PCI bus master.

The I/O control gate array (GA) 15 is a single LSI for controlling various I/O devices. In FIG. 8, the I/O control GA 15 includes a PCI/ISA bridge 152 for coupling between the internal PCI bus 2a and an internal ISA bus 2b.

A USB interface 153 for controlling peripheral devices coupled to the USB interface IS3, such as an external keyboard, a bus master IDE controller 154 for controlling the DVD-ROM driver, a display controller 155 for scaling and filtering operations of the graphics data and also for blending the graphics data and the motion picture data, and a MPEG2 interface 156 for controlling interfaces between the internal PCI bus 2a and the MPEG2 decoder are coupled to the internal PCI bus 2a.

Included in the display controller 155 is a memory controller 201 for controlling access to the video memory (VRAM) 103, a bit block transfer circuit (Bit Blt) 202 for executing various logical operations between bit maps of a transferer and a transferee and scaling up or down the bit maps, a graphics/video mixer 203, and a PCM audio controller 204. The graphics/video mixer 203 includes the RGB palette 104a, the color space converter 104b, the filter 105, the first scaler 106 for the graphics data, the second scaler 107 for the video data and the α-blending circuit 108. The PCM audio controller 204 is a PCM audio source for converting audio data, such as sound effects for the graphics data, to PCM audio data.

In the system in FIG. 8, the DVD-ROM driver 101 reads an application program file for controlling a reproduction of the DVD images from the DVD media and loads the program in the main memory 13. Under the control of the program, the CPU 11 reads out graphics data that are used, for example, as a background scene for motion picture data read out from the DVD media and writes the data into the VRAM 103. Further, the CPU 11 transfers audio data to the PCM audio controller 204.

The graphics/video mixer 203 reads out graphics data for a plurality of displaying lines that includes a displaying object line from the VRAM 103, alternately, in a time sharing fashion. Then the mixer 203 executes the horizontal scaling and the vertical filtering for the graphics data in a pipeline operation. The PCM audio controller 204 converts the audio data to the PCM audio data, and provided them to the digital-to-analog converter (DAC) 23.

The motion picture data stored in the main memory 13 are provided to the MPEG2 decoder 102 through the DVD-ROM drive 101. In the MPEG2 decoder 102, the video data and the subpicture data included in the MPEG2 program stream are respectively decoded and the digital video data under the YCrCb 422 format are generated. The audio data included in the MPEG2 program stream are directly sent from the MPEG2 decoder 102 to the AC3 decoder 24 and the AC3 decoder 24 decodes the audio data.

The decoded digital video data under the YCrCb 422 format are sent to the graphics/video mixer 203 for blending with the graphics data. After blending in the α-blending circuit 108, the combined data are converted to the image signals (referred to as "composite signals" or the "S signals") in the NTSC/PAL encoder 109 for displaying on the television monitor 200. The audio data decoded in the AC3 decoder 24 are mixed with the PCM audio data from the PCM audio controller 204 in the audio mixer 25 and supplied to audio input lines of the television monitor 200.

Figure 9:
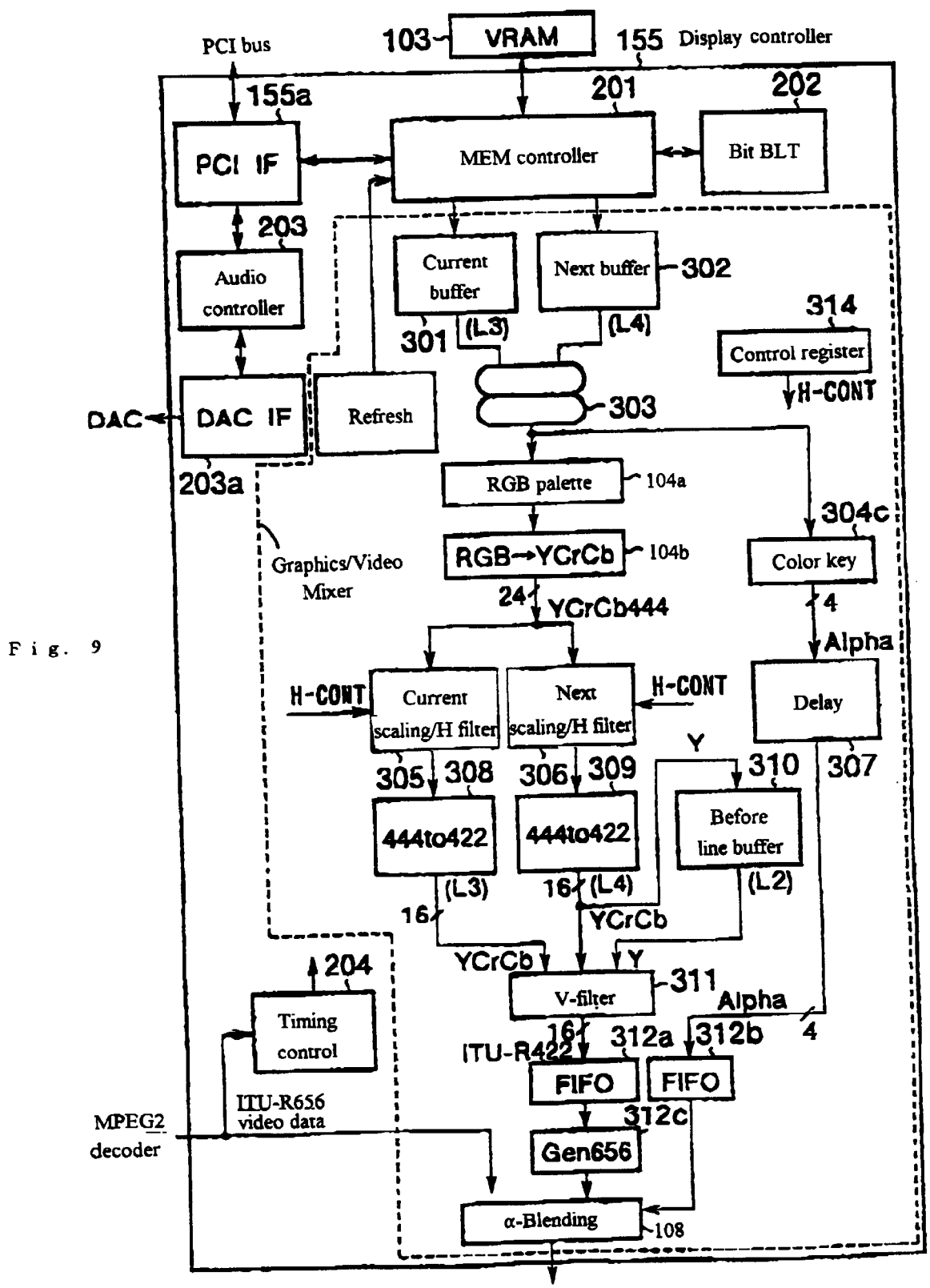
FIG. 9 is a block diagram of a graphics/video mixer used in the image display control apparatus shown in FIG. 1.

FIG. 9 shows a detailed block diagram of the graphics/video mixer 203 and the peripheral circuits shown in FIG. 8. As shown in FIG. 9, the graphics/video mixer 203 includes a current buffer 301, a next buffer 302, a multiplexer 303, the RGB palette 104a, the RBG/YCrCb color space converter 104b, a color key circuit 304c, a current scaling H filter 306, a next scaling H filter 306, a delay circuit 307, a first YCrCb 444/442 converter 308, a second YCrCb 444/442 converter 309, a before line buffer 310, a first FIFO buffer 312a, a second FIFO buffer 312b, the α-blending circuit 108, and a control register 314.

The current buffer 301 and the next buffer 302 are used for temporary storage of the graphics data read out from the VRAM 103 by the memory controller 201. The current buffer 301 stores the graphics data for a current displaying target line and the next buffer 302 stores the data for the next displaying target line. The memory controller reads out these current and next displaying graphics data alternately in a predetermined unit size for the graphics data in a time sharing fashion. For example, if the graphics data stored in the VRAM 103 are 16 bits/pixel and the data bus for the VRAM 103 are 32 bits, the graphics data for the current and next displaying target lines are read out alternately at a unit size of 2 pixels. The multiplexer 303 selects the current buffer 301 and the next buffer 302 alternately and outputs the graphics data in the selected buffer at the unit pixel in a serial fashion. The unit pixel data are supplied to the RGB palette 104a and the color key circuit 304c.

Figure 10:
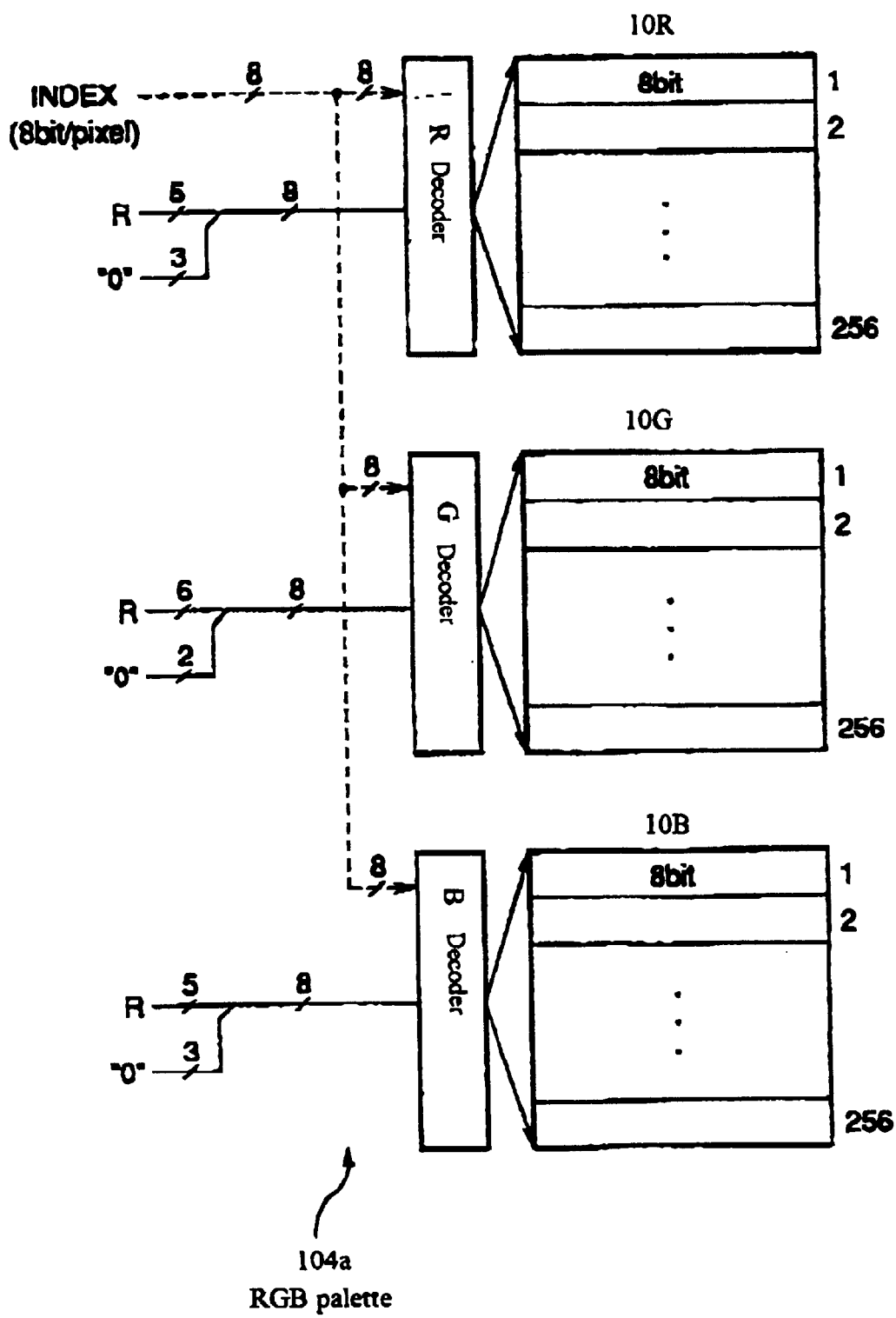
FIG. 10 illustrates a color pallette provided in the image display controller shown in FIG. 1.

The RBG/YCrCb color space converter 104b is comprised of three color tables of 10R, 10G and 10B for respectively corresponding to the red (R), green (G) and blue (B) colors, as depicted in FIG. 10. As shown in FIG. 10, each of the color tables 10R, 10G and 10B is comprised of 256 entries and an address decoder for selecting one entry among the 256 entries by decoding the pixel data of 8 bits. Each of the entries stores the color data of 8 bits.

In the case that the graphics data of 16 bits/pixel are stored in the VRAM 103, the data is divided as follows for the respective pixel data for each color:

R=5 bits, G=6 bits and B=5 bits.

The R data of 5 bits are used for an upper bit portion of the 8 bit data provided into the red (R) color table. Similarly, the data of 6 bits and the data of 5 bits are respectively used for an upper bit portion of the 8 bit data of the respective green and blue color tables as indicated in FIG. 10. Accordingly, the RGB color palette 104a in FIG. 9 operates as a color correction table and outputs color data of 24 bits from the graphics data of 16 bits/pixel from the VRAM 103.

In the case that the graphics data stored in the VRAM 103 are index color data of 8 bits/pixel, the index color data are commonly supplied to the respective R, G and B color tables and are converted to the color data of 24 bits, respectively. The color key circuit 304c in FIG. 9 keeps a corresponding relationship between the color of the pixel data and the α value of 4 bits. The color key circuit 304c provides the α value corresponding to a color for the input pixel data. The α value provided by the color key circuit 304c is delayed in a delay circuit 307 during the times for the color space conversion (i.e., the horizontal scaling and the vertical scaling operations). Then the α value is sent to the α-blending circuit 108 through the second FIFO buffer 312b.

The RGB/YCrCb color space converter 104b converts the respective R, G and B color data from the RGB color palette 104a to 24 bit data corresponding to the YCrCb 444 format of the video standard. The converted YCrCb data are provided to the current scaling H filter 305 or the next scaling H filter 306. The current scaling H filter 305 and the next scaling H filter 306 execute the horizontal scaling operation on the graphics data for the displaying target line and the next displaying line, respectively.

The converted graphics data for the displaying target line in the YCrCb data of the 444 format are supplied to the current scaling H filter 305. The converted graphics data for the next displaying target line in the YCrCb data of the 444 format are supplied to the next scaling H filter 306. At first, these scaling H filters execute a horizontal filtering operation for reducing the brightness and the color signal bandwidth of the 444 formatted YCrCb data in the target line. Next, the scaling H filter circuits execute the horizontal scaling operation.

The horizontal filtering operation is executed in a circuit for integrating and summing calculations as shown in FIG.

Figure 11:
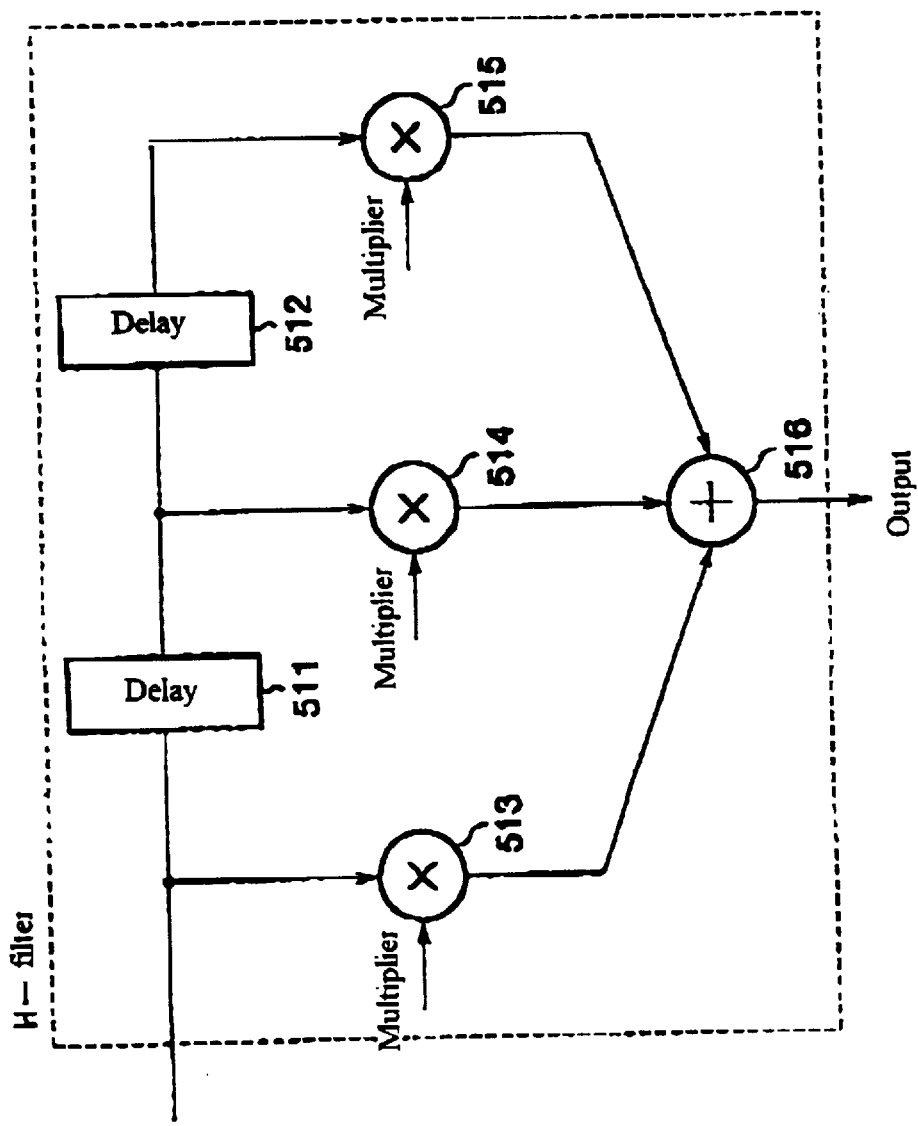
FIG. 11 illustrates a horizontal filtering circuit provided in the image display controller shown in FIG. 1.

11. FIG. 11 depicts a horizontal filtering circuit constructed with three taps. For executing the integration and sum calculation for the successive 3 pixels, the horizontal filtering circuit comprises first and second delaying circuits 511 and 512 for respectively delaying one pixel and first, second and third integrators 513, 514 and 515 and an adder 516. An integration value (coefficient) for the respective integrators is determined as a function of a control parameter value provided from the control register 314 in FIG. 9.

The horizontal scaling is executed by thinning the pixel that is filtered in the horizontal filtering circuit or by successively outputting the same pixel. The execution contents of the horizontal scaling is determined by a H-CONT value of the scaling parameter provided from the control register 314. The H-CONT value of the scaling parameter is determined as a function of both the display aspect ratio and the resolutions for the graphics source. The horizontally filtered and scaled pixels for the displaying target line are sent to the YCrCb 444/442 converter 308 in FIG. 9 for converting to the YCrCb data of 422 format having a 16 bit width. The YCrCb data are provided to the vertical filter circuit 311 in FIG. 9.

The next scaling/H filter 306 executes the horizontal filtering operation for reducing the brightness and the color signal bandwidth of the converted YCrCb data of the 444 format for the next target line and then executes the horizontal scaling operation. The horizontal filtering operation is executed in the circuit for integrating and summing calculations by using a FIR filter as shown in FIG. 11. The horizontally filtered and scaled pixels for the displaying target line are sent to the YCrCb 444/442 converter 309 in FIG. 9 for converting to the YCrCb data of 422 format having a 16 bit width. The converted YCrCb data are provided to the vertical filter circuit 311 in FIG. 9. The Y data among the converted YCrCb data are stored into a before line buffer 310 in FIG. 9 for use as one-before line data during a subsequent scanning operation.

Figure 12:
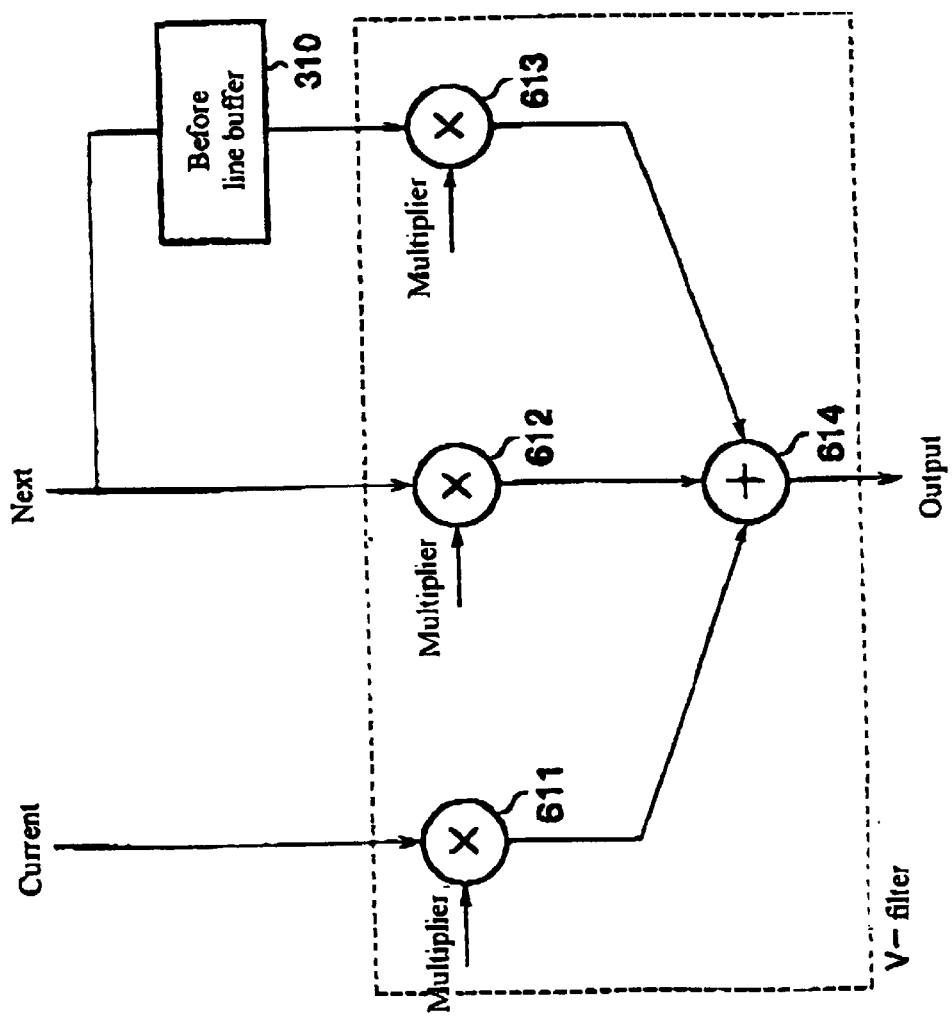
FIG. 12 is used to illustrate a vertical filtering circuit provided in the image display controller shown in FIG. 1.

The vertical filter 311 in FIG. 9 executes the vertical filtering operation among the three lines by using a pixel position data corresponding to the before line stored in the before-line buffer 310. The vertical filtering operation is also executed in a circuit for integrating and summing calculations by using a FIR filter as shown in FIG. 12. As shown in FIG. 12, the vertical filtering circuit comprises first, second and third integrators 611, 612 and 613 feeding an adder 614 for calculation of integration and summing of successive three lines. An integration value (coefficient) for the respective integrators is determined by a control parameter value provided from the control register 314 in FIG. 9.

Figure 13:
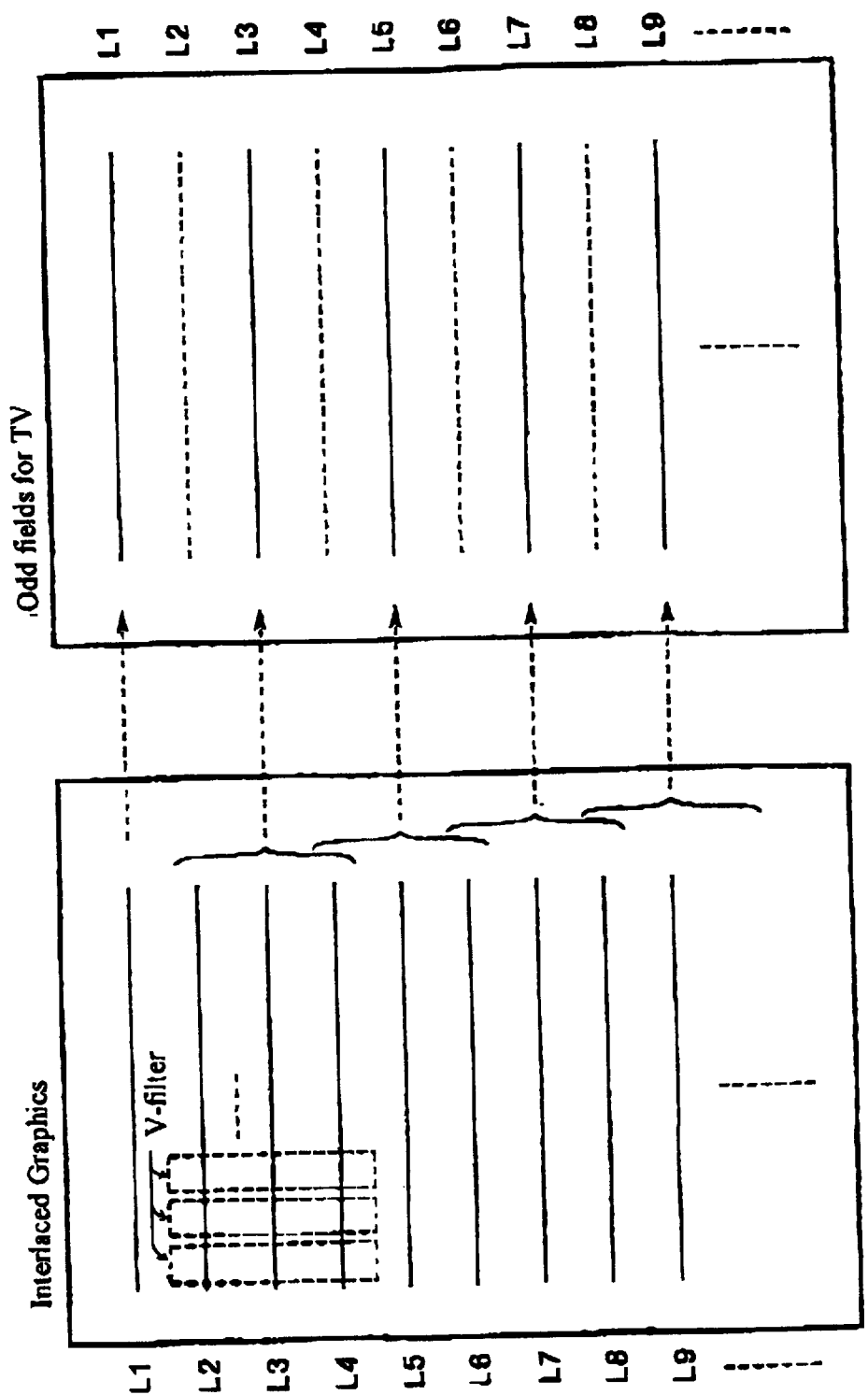
FIG. 13 is used to illustrate a vertical filtering operation applied in the image display controller shown in FIG. 1.

FIG. 13 is used to illustrate the vertical filtering operation. In this example, the displaying target line is the line L3. The vertical filtering is executed from the front position pixel for the respective lines L2, L3 and L4 in a successive order. By this vertical filtering, graphics data of one line is filtered for displaying in an odd field of the television. In the next scanning operation, the line L5 becomes the displaying target line and is the next adjacent odd line to line L3, and the vertical filtering is executed among the three lines L4, L5 and L6.

After the vertical filtering, the obtained pixel data are supplied to a synchronizing information insertion circuit (Gen656) 312c in FIG. 9. The insertion circuit 312c generates the ITU-R656 type digital data that are the same as the decoded DVD video data by inserting synchronization information in the YCrCb data.

In the α-blending circuit 108 in FIG. 9, the graphics data and the DVD video data are combined as a function of the α value of the pixel position corresponding to the displaying target line. This blending is performed at a timing in accordance with the synchronization signals in the DVD video data detected by the timing control circuit 204 in FIG. 9. The control register 314 can be read/written by the CPU 11 based on a control parameter designating the characteristics of the horizontal/vertical filterings and the horizontal scaling.

As explained above, in the circuit of FIG. 9, the horizontal scaling and the vertical filtering are executed as a pipe-line operation by executing the horizontal scaling of the graphics data for a plurality lines including the displaying target line alternately in a time sharing fashion and then by executing the vertical filtering against the horizontally scaled data in the same pixel positions in the plurality of lines at a predetermined unit. By performing this pipe-line operation, the scaling and the vertical filtering can be effectively executed without using the off-screen areas of the VRAM 103. Consequently, it becomes possible to display the graphics data on a television monitor 200 with improved quality without using a special and/or large video memory.

Figure 14:
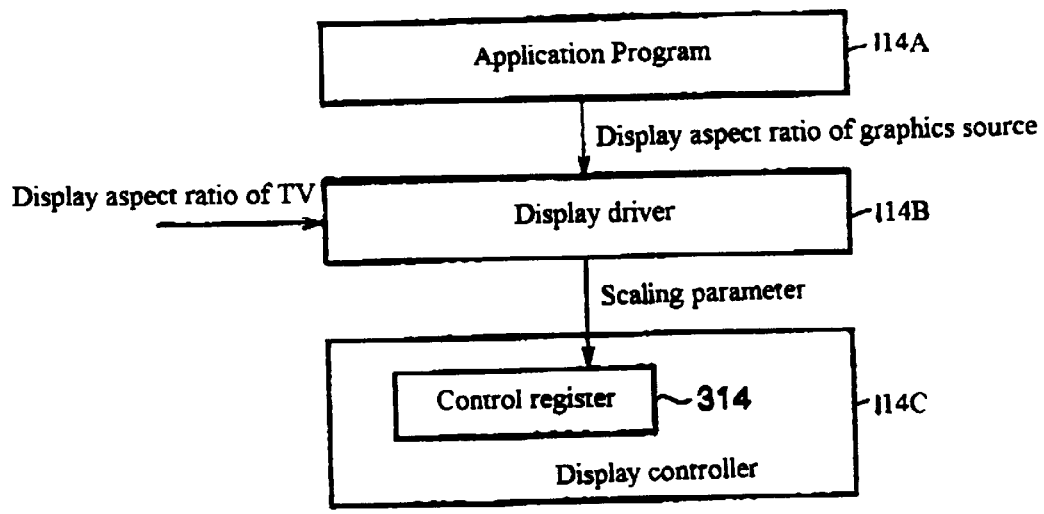
FIG. 14 is used to illustrate software structure for setting a scaling parameter in the control register provided in the image display control apparatus shown in FIG. 1.

FIG. 14 is used to illustrate a method for setting a control parameter (scaling parameter) of the horizontal scaling in the control register 314 shown in FIG. 9. The DVD reproduction control application program 114A detects whether the graphics source read out from the DVD media has the resolutions corresponding to the display aspect ratios of 16:9 or the 4:3 by using the header information embedded in the graphics data. The detected result is provided to a display driver 114B.

The display driver 114B determines the scaling method based on the TV display aspect ratio of 16:9 or 4:3 that is selected by a user or is automatically detected and the display aspect ratio of the graphics data. Then, the display controller 114C sets the scaling parameter for performing the determined scaling method in the control register 314.

Figure 15:
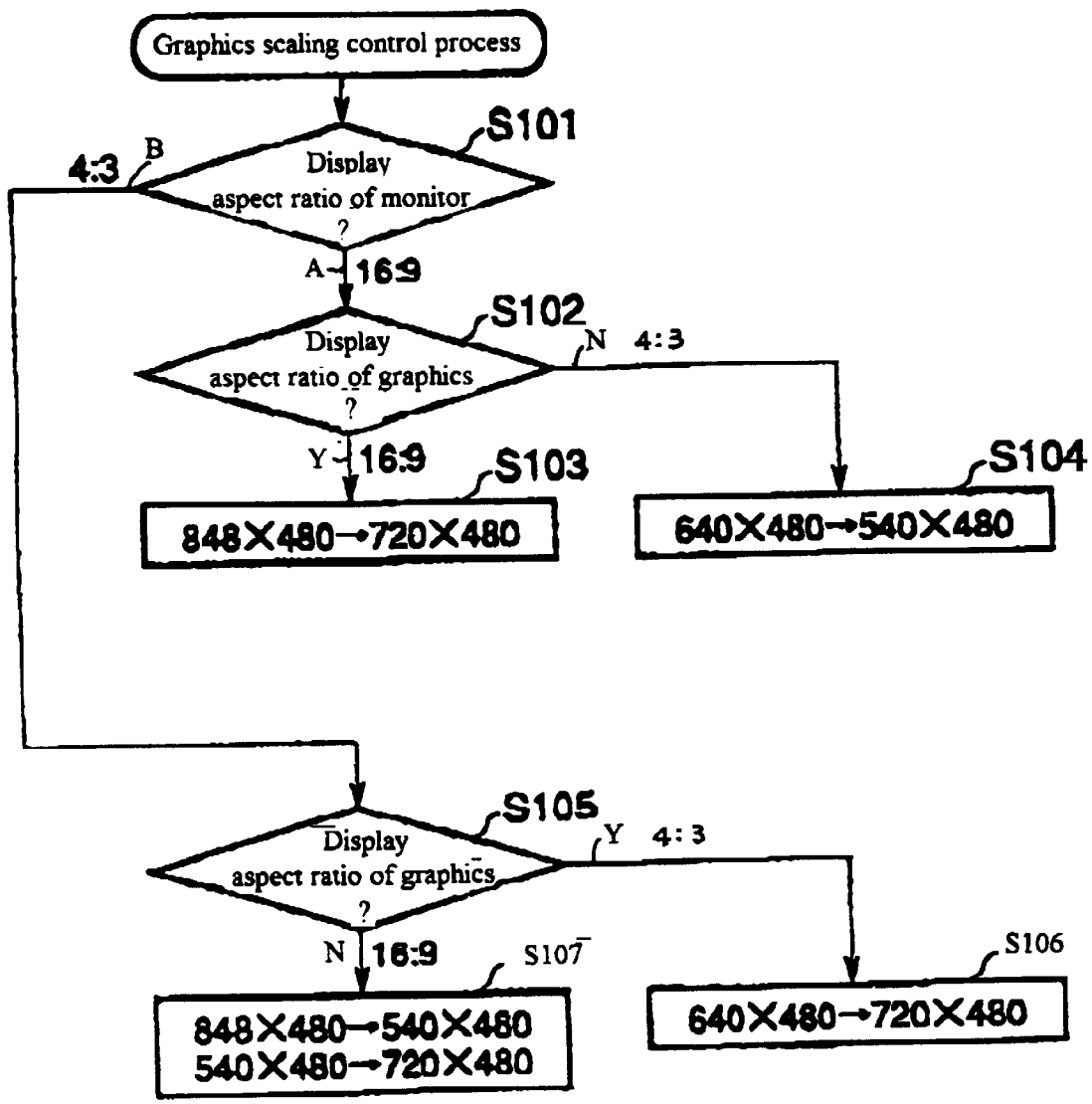
FIG. 15 is a flow chart for illustrating the steps for graphics scaling applied in the image display control apparatus shown in FIG. 1.

FIG. 15 is a flowchart illustrating a control method of the graphics scaling applied to the graphics data. In FIG. 15, at first, the display aspect ratio of the television monitor is determined (step S101). If the monitor is selected to display the images in the display aspect ratio of 16:9 (A branch at step S101) and the display aspect ratio of the graphics has the same ratio and has the corresponding resolutions of 848×480 (Y branch at step S102), the horizontal down scaling of the resolutions are performed from 848×480 to 720×480 (step S103). If the monitor is selected to display in the display aspect ratio of 4:3 (B branch at step S101) and the display aspect ratio of the graphics has the same ratio and has the corresponding resolutions of 640×480 (Y branch at step S102), the horizontal up scaling of the resolutions are performed from 640×480 to 720×480 (step S106). If the display aspect ratio of the graphics is the 16:9 (N branch at step S105), two types of horizontal scaling are performed depending upon the original resolutions as depicted at the step S107.

Figure 16:
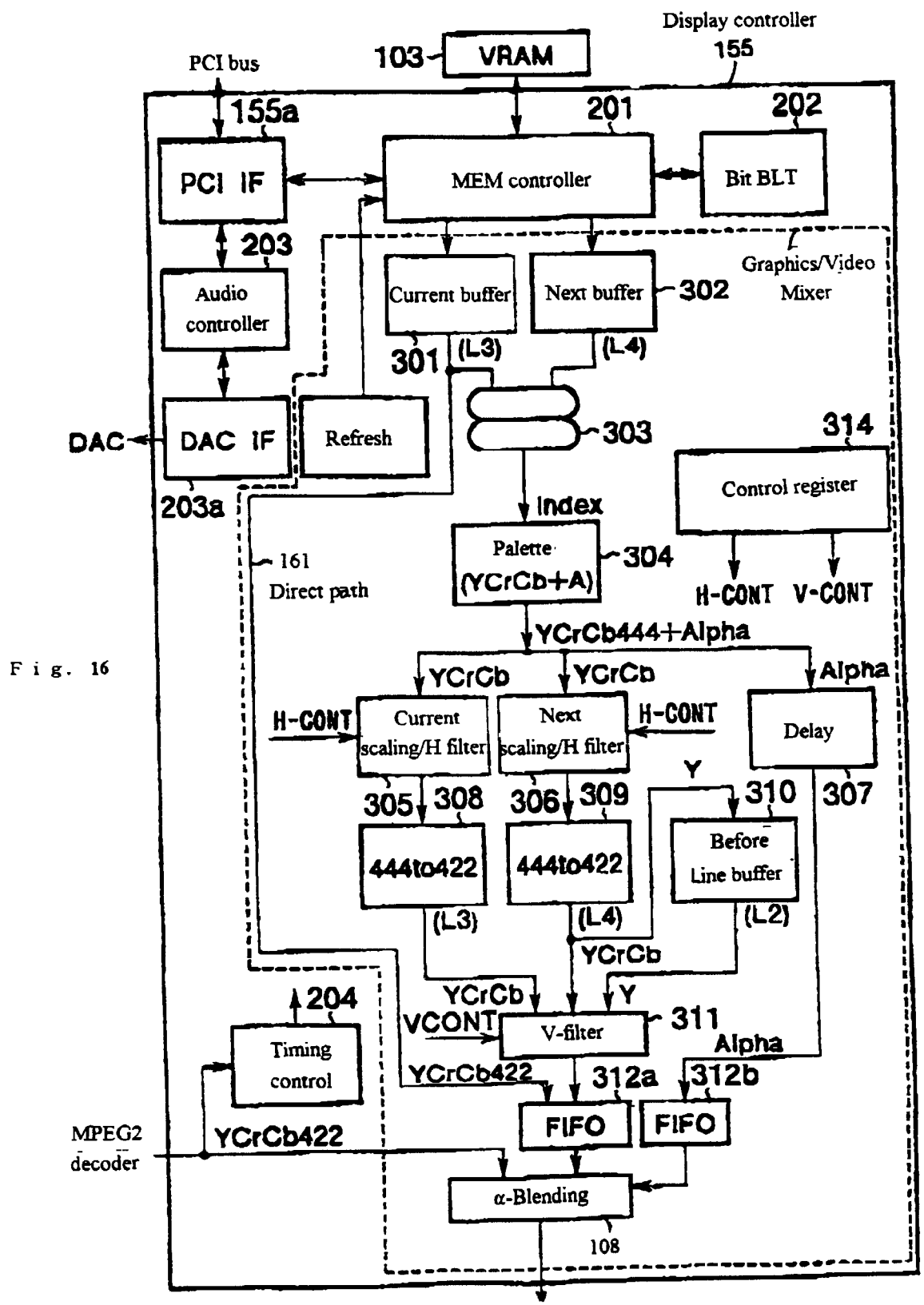
FIG. 16 is a block diagram illustrating another embodiment of the graphics/video mixer provided in the image display control apparatus shown in FIG. 1.

FIG. 16 illustrates a block diagram of another embodiment of the graphics/video mixer 203 and the peripheral circuits shown in FIG. 8. In this embodiment, the graphics/video mixer 203 includes a current buffer 301, a next buffer 302, a multiplexer 303, a color palette 304, a current scaling H filter 305, a next scaling H filter 306, a delay circuit 307, a first YCrCb 444/442 converter 308, a second YCrCb 444/442 converter 309, a before line buffer 310, a first FIFO buffer 312a, a second FIFO buffer 312b, an α-blending circuit 108, and a control register 314.

The current buffer 301 and the next buffer 302 are used for temporary storage of the graphics data read out from the VRAM 103 by the memory controller 201. The current buffer 301 stores the graphics data for a current displaying target line and the next buffer 302 stores the data for the next displaying target line. The memory controller reads out these current and next displaying graphics data alternately in a predetermined unit size for the graphics data in a time sharing fashion. For example, if the graphics data stored in the VRAM 103 are 8 bits/pixel and the data bus for the VRAM 103 are 32 bits, the graphics data for the current and next displaying target lines are read out alternately at a unit size of 4 pixels.

Figure 17:
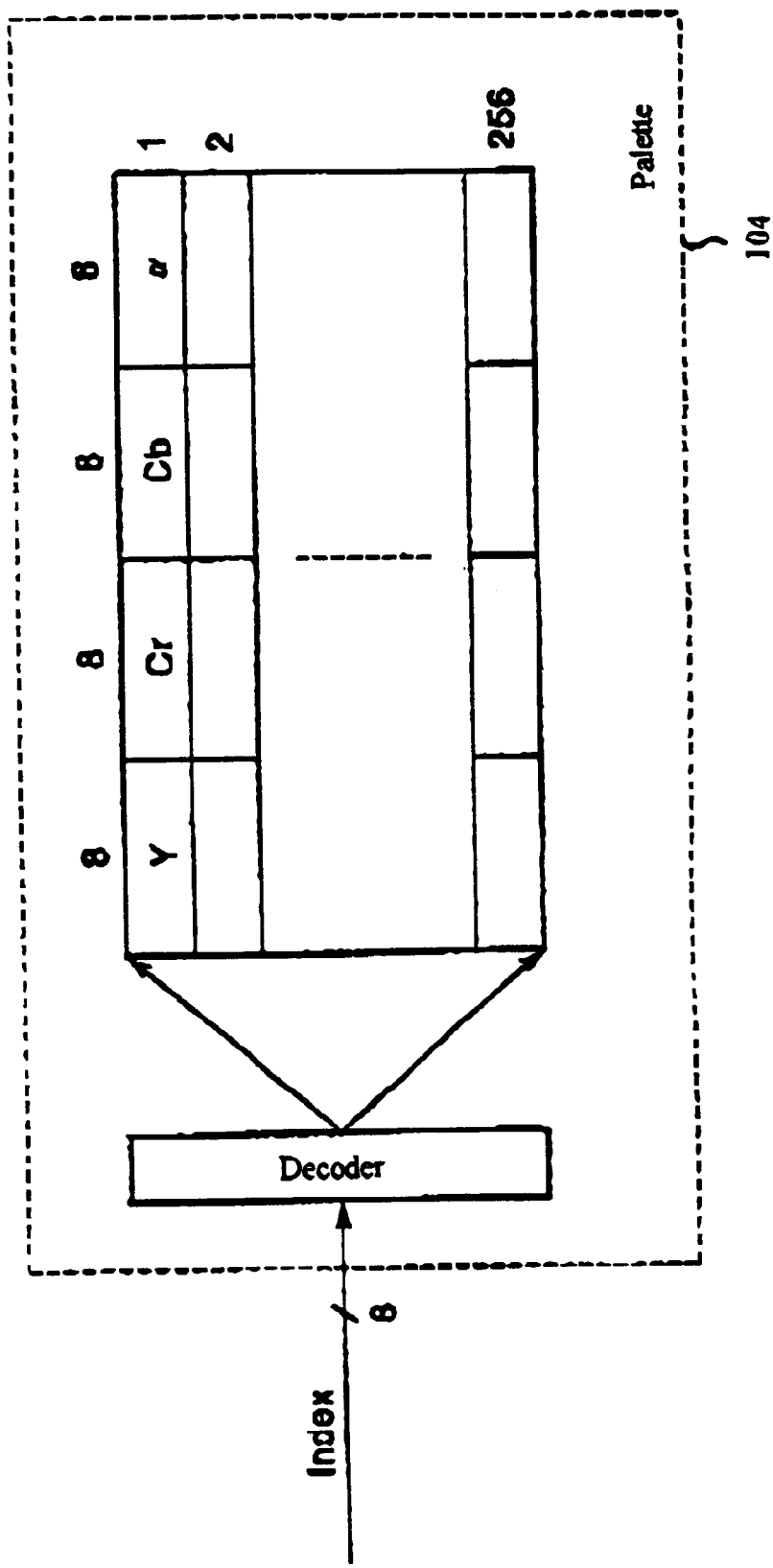
FIG. 17 shows another embodiment of a color palette provided in the graphics/video mixer shown in FIG. 16.

The multiplexer 303 alternately selects the current buffer 301 and the next buffer 302 and outputs the graphics data in the selected buffer at the unit pixel in a serial fashion. The unit pixel data are supplied to the color palette 304. The color palette 304 is comprised of 256 entries and an address decoder for selecting one entry among the 256 entries by decoding an input index value of the 8 bit pixel data, as shown in FIG. 17. Each of the entries is registered as a set of the YCrCb data of 24 bits corresponding to the 444 format and the α value of 8 bits.

The output YCrCb data of the 444 format from the color palette 304 are sent to the current buffer 301 or the next buffer 302. The α value is sent to the delay circuit 307 for delaying during the horizontal scaling and the vertical scaling operations. Then the α value is sent to the α-blending circuit 108 through the second FIFO buffer 312b. The current scaling H filter 305 and the next scaling H filter 306 execute the horizontal scaling operation on the graphics data for the displaying target line and the next displaying line, respectively.

The converted graphics data for the current displaying target line in the YCrCb data of the 444 format are supplied to the current scaling H filter 305. The converted graphics data for the next displaying target line in the YCrCb data of the 444 format are supplied to the next scaling H filter 306. The scaling H filters execute a horizontal filtering operation for reducing the brightness and the color signal bandwidth of the 444 formatted YCrCb data in the target line. Next, the scaling H filter circuit executes the horizontal scaling operation. The horizontal filtering is executed in a circuit for integrating and summing calculations by using a FIR filter. The horizontally filtered and scaled pixels for the displaying target line are sent to the YCrCb 444/442 converter 308 for converting to the YCrCb data of a 422 format. The converted YCrCb data are supplied to the vertical filter circuit 311. The Y data among the YCrCb data is stored in the before-line buffer 310 for use during the next scanning operation as a previous scanning line data.

The vertical filter 311 executes the vertical filtering operation among the three lines by using a pixel position data corresponding to the before line stored in the before-line buffer 310 at every time when the pixel data for the displaying target line and for the next line are completed. The vertical filtering is also executed by integrating and summing calculations used by the FIR filter. The obtained pixel data from the vertical filtering are sent to the α blending circuit 108 through the first FIFO buffer 312a for combining with the motion picture data of the YCrCb 422 format under the α value of the pixel corresponding to the position of the displaying line.

Further, the current buffer 301 is directly coupled to the first FIFO buffer 312a through a direct path 161 for directly sending the graphics data to the NTSC/PAL encoder 109 through the first FIFO buffer 312a and the α-blending circuit 108. This direct path is used when the CPU instructs to write a stationary image by using a plurality of colors, more than the data of the index mode, such as the plurality of color data of 16 bits/pixel into the video memory 103.

By changing the graphics data processing route between the index color mode case and the plurality of color data case, it becomes possible to obtain an appropriate quality display, efficiently. The selection of the data processing routes is performed by setting a particular value in the PCI interface 155a so as to change the inputs to the first FIFO buffer 312a.

As explained above, by using the line buffer 310 for storing the graphics data for the previous one line in the graphics/video mixer, it becomes possible to perform the vertical filtering among the data for the three lines by reading out the graphics data for the two lines alternately in a time sharing fashion. In this embodiment, the vertical filtering is performed among the three lines. However, it is possible to perform the vertical filtering among, for example, five lines.

Figure 18:
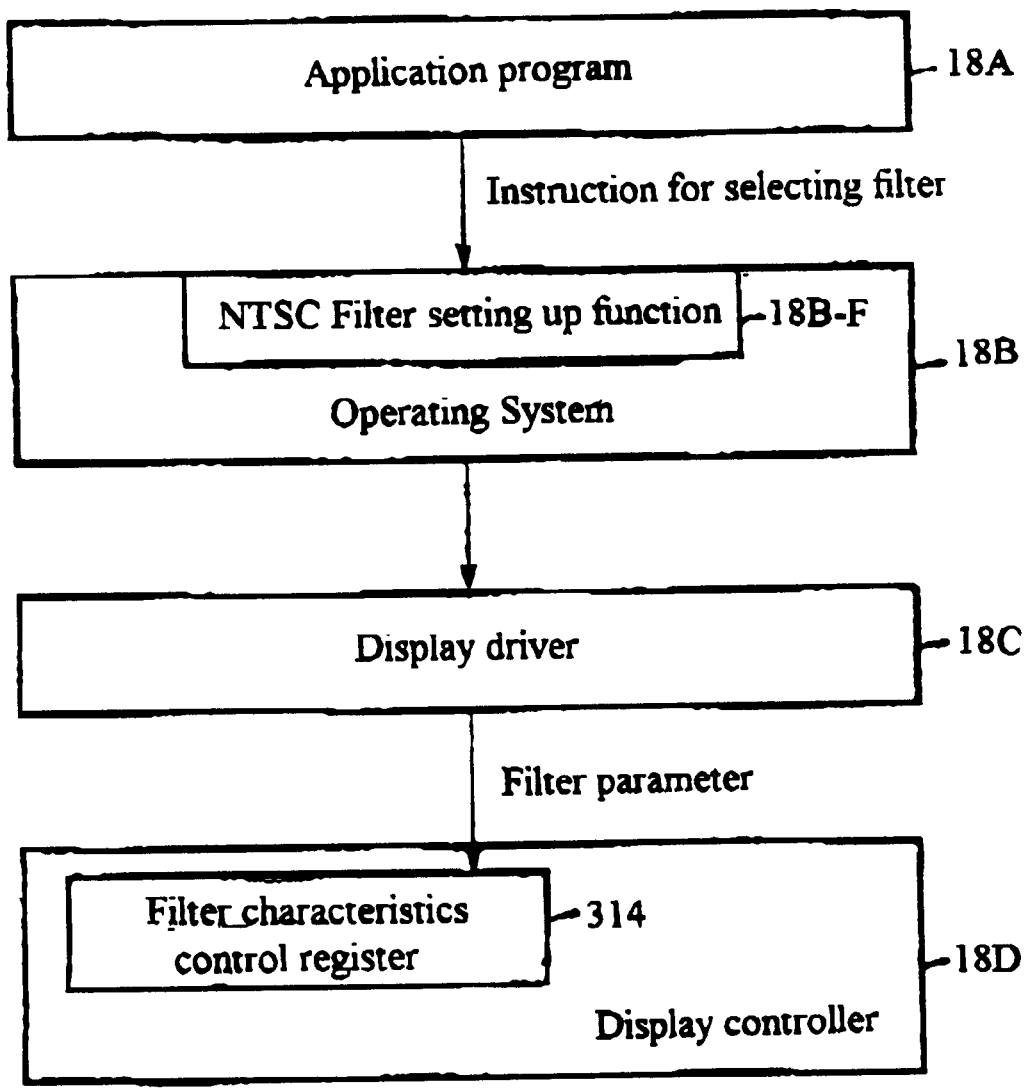
FIG. 18 is used to illustrate sequences for dynamically changing filtering characteristics of horizontal/vertical filtering circuits provided in the graphics/video mixer shown in FIG. 16.

FIG. 18 illustrates software structure for dynamically changing the filtering characteristics by using the control register 314 in FIG. 16. The application program 18A selects the filtering operation and transmits it to the operating system 18B. In the operating system 18B, a filter setting function 18B–F receives the instruction from the application program 18A. The instruction for changing the filtering characteristics is issued from the application program 18A, and the instruction is transferred to a display driver 18C from the operating system 18B. The display driver 18C is a program for controlling a display controller 18D. The display driver 18C set a predetermined control parameter in the control register 314 in response to the instruction for changing the filtering characteristics. In this way, it is possible to dynamically change the filtering characteristics for character displaying portions and for image displaying portions. Accordingly, the best filtering characteristics for given image contents can be automatically obtained.

Figure 19:
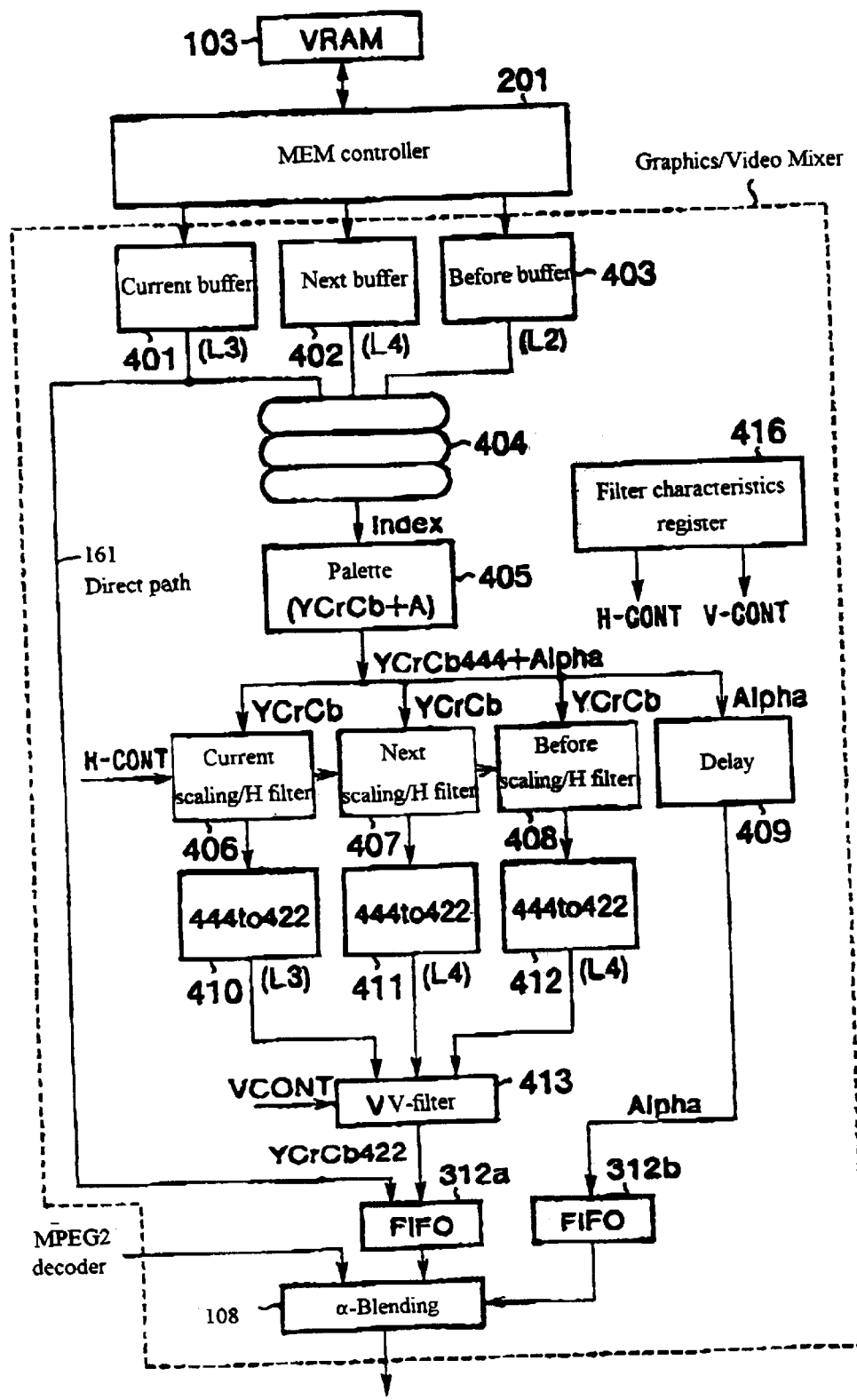
FIG. 19 is a block diagram illustrating another embodiment of a graphics/video mixer provided in the image display control apparatus shown in FIG. 1.

FIG. 19 is a block diagram of another embodiment of the graphics/video mixer 203. This graphics/video mixer performs the vertical filtering of the three lines without the line buffer as depicted in FIG. 16. Instead of using the line buffer, the graphics/video mixer has three buffers. That is, the graphics/video mixer includes a current buffer 401 for storing the graphics data for a displaying target line, a next buffer 402 for the next line and a before buffer 403 for the before line. Further, in order to perform the horizontal scaling of the respective lines in parallel, a current scaling H filter 406, a next scaling H filter 407 and a before scaling H filter 408 are provided for the respective lines.

The vertical filter 413 is constructed so as to perform the vertical filtering not only for the Y data but also for both of Cr and Cb data. As a consequence, it becomes possible to display blended images with high quality without blurring the colors as compared to the case of the vertical filtering for the Y data only.

As explained above in detail, the system and method according to the present invention can display mixed titles of graphics and motion pictures on an interlaced video monitor with improved quality. Further, system and method according to the present invention can perform the scaling and filtering, efficiently, without using an expensive video memory having a wide offscreen area.

The present invention is described in terms of displaying mixed data on a monitor that has a longer width in a horizontal direction. However, it is also possible to apply the teachings of the present invention for displaying mixed data on a monitor that has a longer width in a vertical direction as will be apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for controlling a display of mixed images of graphics data having a pixel aspect ratio and motion picture data on a video monitor having a display aspect ratio different from the pixel aspect ratio, comprising:

means for storing the graphics data and the motion picture data wherein the graphics data is pre-scaled up or pre-scaled down in at least one of a horizontal or vertical resolution direction; and means for controlling generation of the mixed images of the graphics data on the video monitor, comprising:
means for reading out the graphics data and the motion picture data from the storing means;
means for memorizing the pre-scaled graphics data;
means for converting the graphics data read out from the memorizing means to a particular color data applicable to the video monitor;
means for filtering the graphics data for reducing brightness and color band width of the graphics data;
means for scaling down or up the resolution of the filtered graphics data in accordance with the display aspect ratio for the video monitor; and
means for mixing the scaled down or up graphics data from the scaling means and the motion picture data on a video window of the video monitor.

2. The system according to claim 1, wherein:
the scaling means comprises:
a first means for scaling the graphics data for displaying a current target line; and
a second means for scaling the graphics data for displaying a next target line.

3. The system according to claim 1, further comprising:
first and second means for buffering the graphics data from the memorizing means for displaying a current target line and a next target line, respectively.

4. The system according to the claim 1, wherein:
the horizontal resolution of the graphics data is determined to be a value that is selected among multiples of 8 or 16 and so as to be a closest value of multiplication of a horizontal resolution of the motion picture data and a pixel aspect ratio of the motion picture data.

5. The system according to the claim 1, wherein:
the resolutions (horizontal×vertical) of the motion picture data are 848×480; and
the resolutions (horizontal×vertical) of the graphics data are 848×480.

6. The system according to the claim 1, wherein:
the resolutions (horizontal×vertical) of the motion picture data are 720×480; and
the resolutions (horizontal×vertical) of the graphics data are 868×480.

7. The system according to the claim 1, wherein:
the resolutions (horizontal×vertical) of the motion picture data are 720×480; and
the resolutions (horizontal×vertical) of the graphics data are 832×480.

8. The system according to the claim 1, further including:
means for blending the scaled graphics data and the motion picture data in order to display the blended image on the video monitor.

9. A system for controlling a display of graphics data having a pixel aspect ratio of 1:1 on a video monitor having a display aspect ratio of 16:9, comprising:

means for storing the graphics data and video data, wherein a resolution of the graphics data is pre-scaled up in a horizontal resolution direction so as to keep a same pixel aspect ratio of 1:1 when the graphics data are displayed on the video monitor having the display aspect ratio of 16:9;

means for reading out a center area portion of the graphics data by eliminating side area portions from the graphics data;

means for scaling down the read out graphics data in a horizontal resolution direction to coincide to a horizontal resolution of the video data; and means for displaying the scaled graphics data on the video monitor.

10. The system according to the claim 9, wherein:
the horizontal resolution of the graphics data is determined to be a value that is selected among multiples of 8 or 16 and so as to be a closest value of multiplication of a horizontal resolution of the video data and the pixel aspect ratio of the video data.

11. The system according to the claim 9, wherein:
the resolutions (horizontal×vertical) of the video data are 720×480; and
the resolutions (horizontal×vertical) of the graphics data are 848×480.

12. The system according to the claim 9, wherein:
the resolutions (horizontal×vertical) of the video data are 720×480; and
the resolutions (horizontal×vertical) of the graphics data are 868×480.

13. The system according to the claim 9, wherein:
the resolutions (horizontal×vertical) of the video data are 720×480; and
the resolutions (horizontal×vertical) of the graphics data are 832×480.

14. The system according to the claim 9, further including:
means for outputting the video data having the display aspect ratio of 16:9 under a path scanning mode; and
means for displaying and blending the scaled graphics data and the video data supplied by the path scanning mode in order to display the blended image on the video monitor.

15. A system for controlling a display of graphics data having a aspect ratio of 16:9 or 4:3 included in an image source on a video monitor having a display aspect ratio of 16:9 or 4:9, comprising:

means for reading out the graphics data from a memory storing the image source;

means for scaling up or down the read out graphics data in a horizontal resolution direction as a function of the graphics data in the image source and the display aspect ratio of the video monitor; and means for displaying the scaled graphics data on the video monitor;

wherein the horizontal resolution of the graphics data is determined to be a value that is selected among multiples of 8 or 16 and so as to be a closest value of multiplication of a horizontal resolution of the graphics data and the pixel aspect ratio of the graphics data.

16. A method for controlling to display graphics data having a pixel aspect ratio of 1:1 on a video monitor having a display aspect of 16:9, comprising:

storing the graphics data and video data, wherein a resolution of the graphics data is pre-scaled up in a horizontal resolution direction so as to keep a same pixel aspect ratio of 1:1 when the graphics data are displayed on the video monitor having the display aspect ratio of 16:9;

reading out a center area portion of the graphics data by eliminating side area portions from the graphics data;

scaling up the read out graphics data in a horizontal resolution direction to coincide to a horizontal resolution of the video data; and displaying the scaled graphics data on the video monitor.

* * * * *